US006526747B2

(12) United States Patent
Nakatani et al.

(10) Patent No.: US 6,526,747 B2
(45) Date of Patent: Mar. 4, 2003

(54) HYDRAULIC DRIVING DEVICE

(75) Inventors: Kenichiro Nakatani, Shiga (JP); Takashi Kanai, Kashiwa (JP); Yasutaka Tsuruga, Moriyama (JP); Junya Kawamoto, Moriyama (JP); Satoshi Hamamoto, Toyama-ken (JP); Yasuharu Okazaki, Takaoka (JP); Yukiaki Nagao, Toyama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/936,812

(22) PCT Filed: Jan. 24, 2001

(86) PCT No.: PCT/JP01/00439

§ 371 (c)(1), (2), (4) Date: Sep. 18, 2001

(87) PCT Pub. No.: WO01/55603

PCT Pub. Date: Aug. 2, 2001

(65) Prior Publication Data

US 2002/0134227 A1 Sep. 26, 2002

(30) Foreign Application Priority Data

Jan. 25, 2000 (JP) ....................................... 2000-016239
Oct. 3, 2000 (JP) ....................................... 2000-303550

(51) Int. Cl.[7] ................................................ F16D 31/02
(52) U.S. Cl. ............................................ 60/399; 91/446
(58) Field of Search ............................. 60/399; 91/446, 91/447

(56) References Cited

U.S. PATENT DOCUMENTS 4,730,543 A * 3/1988 Holmes ....................... 91/448
4,967,557 A * 11/1990 Izumi et al. .................. 91/446
5,950,426 A * 9/1999 Morita et al. ................. 60/399

FOREIGN PATENT DOCUMENTS

| | | |
|---|---|---|
| JP | 60-11706 | 1/1985 |
| JP | 4-54303 | 2/1992 |
| JP | 7-26588 | 1/1995 |
| JP | 2567720 | 10/1996 |
| JP | 10-196604 | 7/1998 |

* cited by examiner

*Primary Examiner*—F. Daniel Lopez
(74) *Attorney, Agent, or Firm*—Mattingly, Stanger & Malur, P.C.

(57) ABSTRACT

An actuator lock switching valve 50 is provided which communicates a drain line 52 and a pilot line 53 with each other when the valve 50 is in a position C, and which communicates pilot lines 51, 53 with each other when it is shifted to a position D. The pilot line 51 is connected to a delivery line 7 of a hydraulic pump 10, and the pilot line 53 is connected to pressure receiving sections 28*a*, 28*b* provided at ends of the pressure compensating valves 21*a*, 21*b* on the side acting in the closing direction. The actuator lock switching valve 50 has a pressure receiving section 55 connected to the output side of a pilot lock switching valve 43, and is switched over in interlock with shifting of the switching valve 43. In a hydraulic drive system including pressure compensating valves controlled by an LS system, an actuator can be locked with a simple construction and can be prevented from malfunctioning in an inoperative condition while an engine is being driven, even when the system includes a mechanically shifted directional control valve, or even when a mechanically shifted directional control valve is retrofitted to the system.

11 Claims, 11 Drawing Sheets

FIG.9

| | | SW1 (TOTAL UNLOCK) | |
|---|---|---|---|
| | | ON | OFF |
| SW2 (PARTIAL UNLOCK) | ON | 43 ··· A | 43 ··· B |
| | | 110 ··· G | 110 ··· G |
| | OFF | 43 ··· A | 43 ··· B |
| | | 110 ··· G | 110 ··· H |

HYDRAULIC DRIVING DEVICE

TECHNICAL FIELD

The present invention relates to a hydraulic drive system for a construction machine, such as a hydraulic excavator, in which a delivery pressure of a hydraulic pump is held higher than a maximum load pressure of a plurality of actuators by a target differential pressure under load sensing control, and differential pressures across a plurality of directional control valves are controlled by respective associated pressure compensating valves. More particularly, the present invention relates to a hydraulic drive system including a safety device to lock an actuator when it is in an inoperative condition while an engine is being driven, thereby preventing a malfunction.

BACKGROUND ART

A construction machine, such as a hydraulic excavator, includes a safety device for making an actuator immobile even with a control lever manipulated, thereby preventing the machine from malfunctioning, when an operator is not boarded on the machine while an engine is being driven, or when an operator is boarded on the machine, but no work is carried out. When a directional control valve has a pilot-operated spool, a safety device is generally constructed such that a pilot lock switching valve is provided between a pilot pump and a pilot valve of a control lever device, and by shifting the pilot lock switching valve, supply of a hydraulic fluid to the pilot valve of the control lever device is cut off to make the directional control valve locked. One example of that type of the pilot lock switching valve is disclosed in, e.g., Japanese Patent No. 2567720.

Also, as a hydraulic pump control system, there is known the so-called load sensing system (hereinafter referred to also as the "LS system") in which a delivery pressure of a hydraulic pump is held higher than a maximum load pressure of a plurality of actuators by a target differential pressure. Usually, in the LS system, differential pressures across a plurality of directional control valves are controlled by respective associated pressure compensating valves so that a hydraulic fluid can be supplied at a ratio depending on opening areas of the directional control valves regardless of the magnitudes of load pressures during the combined operation in which a plurality of actuators are driven at the same time. Hydraulic drive systems including LS systems are disclosed in, e.g., JP,A 60-11706 and JP,A 10-196604. In such a hydraulic drive system including an LS system, when a directional control valve has a pilot-operated spool, it is also general that a pilot lock switching valve similar to the above-mentioned one is provided as a safety device.

DISCLOSURE OF INVENTION

As described above, a conventional safety device (pilot lock switching valve) for a hydraulic drive system is based on an assumption of a directional control valve being pilot-shifted, and is constructed so as to cut off supply of a hydraulic fluid to a pilot valve of a control lever device, whereby the directional control valve is locked to make an associated actuator locked. However, the directional control valve is not limited to the pilot-shifted one, but may be mechanically shifted by transmitting a motion of a control lever directly to a spool for operating it.

For example, in many of small-sized hydraulic excavators having small swing bodies, such as mini-shovels, a directional control valve for travel is mechanically shifted. Also, in hydraulic excavators, a bucket is usually mounted as a front attachment of a front operating mechanism. With increasing versatility of work, however, it is now general that the bucket is replaceable by another front attachment such as a crusher. In many of such cases, a directional control valve associated with a front attachment other than the bucket is also designed as a mechanically shifted valve. Further, the directional control valve associated with the front attachment other than the bucket is either assembled in a valve unit beforehand or retrofitted to the valve unit.

Thus, when the hydraulic drive system includes a mechanically shifted directional control valve, or when a mechanically operated directional control valve is retrofitted to the hydraulic drive system, the conventional safety device cannot lock the directional control valve and hence cannot make the associated actuator locked.

Another conceivable solution for locking a mechanically shifted directional control valve is to fix a control lever mechanically, but this solution would entail a complicated mechanism.

An object of the present invention is to provide a hydraulic drive system including pressure compensating valves controlled by an LS system, in which an actuator can be locked with a simple construction and can be prevented from malfunctioning in an inoperative condition while an engine is being driven, even when the hydraulic drive system includes a mechanically shifted directional control valve, or even when a mechanically shifted directional control valve is retrofitted to the hydraulic drive system.

(1) To achieve the above object, according to the present invention, there is provided a hydraulic drive system comprising a variable displacement hydraulic pump, a plurality of actuators driven by a hydraulic fluid delivered from the hydraulic pump, a plurality of directional control valves for controlling respective flow rates of the hydraulic fluid supplied from the hydraulic pump to the plurality of actuators, a plurality of pressure compensating valves for controlling respective differential pressures across the plurality of directional control valves, and pump control means for performing load sensing control to hold a delivery pressure of the hydraulic pump higher than a maximum load pressure of the plurality of actuators by a target differential pressure, the plurality of pressure compensating valves including a first pressure compensating valve provided in association with a particular one of the plurality of directional control valves and a second pressure compensating valve provided in association with the other directional control valve than the particular one, wherein the hydraulic drive system further comprises a first lock switching valve having first and second shift positions and outputting a pressure of a hydraulic supply source when the first lock switching valve is shifted from the first position to the second position; and a first pressure receiving section provided at an end of the first pressure compensating valve on the si de acting in the closing direction, and connected to the output side of the first lock switching valve, the first pressure compensating valve being fully closed when the first lock switching valve is shifted to the second position and the pressure of the hydraulic supply source is introduced to the first pressure receiving section.

Thus, the first lock switching valve is provided, the first pressure receiving section is provided in the first pressure compensating valve to be connected to the output side of the first lock switching valve, and the pressure of the hydraulic supply source is introduced to the first pressure receiving section when the first lock switching valve is shift ed to the second position, thereby fully closing the first pressure compensating valve. With such an arrangement, even when the particular directional control valve is a mechanically shifted valve, the actuator associated with the particular directional control valve can be locked and hence prevented from malfunctioning in an inoperative condition while an engine is being driven. Also, since the first pressure receiving section can be provided by utilizing a pressure receiving section that is originally provided in an ordinary pressure compensating valve for a drain passage, the actuator can be locked with a simple construction. Moreover, since a main passage for supplying the hydraulic fluid to the actuator therethrough is cut off by the first pressure compensating valve, the actuator can be reliably locked.

Further, even when a mechanically shifted directional control valve for a front attachment is added to employ an additional attachment such as a crusher, an actuator for the attachment can be locked with a simple construction by introducing an output pressure of the first lock switching valve to a pressure receiving section of an associated pressure compensating valve.

(2) In the above (1), preferably, the particular directional control valve is a mechanically shifted valve, and the other directional control valve than the particular one is a pilot-shifted valve driven by a pilot control pressure.

(3) In the above (1) or (2), preferably, the hydraulic drive system further comprises a pilot hydraulic source; operating means connected to the pilot hydraulic source via a pilot line, generating the pilot control pressure based on a hydraulic pressure of the pilot hydraulic source, and including pilot valves for driving the other directional control valve than the particular one; a second lock switching valve disposed in the pilot line, having third and fourth shift positions, and cutting off the pilot line when the second lock switching valve is shifted from the third position to the fourth position, the second lock switching valve being operated by an operator; and interlock switching means for shifting the first lock switching valve from the first position to the second position in interlock with shifting of the second lock switching valve from the third position to the fourth position.

With those features, when the second lock switching valve is shifted from the third position to the fourth position, the pilot line is cut off and the operating means can no longer generate the pilot control pressure, whereby the actuator associated with the other directional control valve than the particular one can be locked. At the same time, the first lock switching valve is shifted from the first position to the second position in interlock with the shifting of the second lock switching valve. Therefore, the actuator associated with the particular directional control valve can be locked as mentioned in the above (1).

(4) In the above (3), preferable, the hydraulic drive system further comprises a second pressure receiving section provided at an end of the second pressure compensating valve on the side acting in the closing direction, and connected to the output side of the first lock switching valve.

With that feature, for the actuator associated with the other directional control valve than the particular one, dual lock functions of locking the actuator are provided by locking both the other directional control valve and the second pressure compensating valve. Therefore, that actuator can be more reliably locked.

(5) In the above (3), preferably, the interlock switching means includes a third pressure receiving section which is provided at an end of the first lock switching valve on the side acting to shift the first lock switching valve to the first position, and which is connected to the pilot line on the output side of the second lock switching valve.

With that feature, when the second lock switching valve is shifted to the fourth position, the first lock switching valve can be shifted to the second position.

(6) In the above (1) or (2), preferably, the hydraulic drive system further comprises a pilot hydraulic source; operating means connected to the pilot hydraulic source via a pilot line, generating the pilot control pressure based on a hydraulic pressure of the pilot hydraulic source, and including pilot valves for driving the other directional control valve than the particular one; a second lock switching valve disposed in the pilot line and having third, fourth and fifth shift positions, the second lock switching valve being operated by an operator; and a third pressure receiving section provided in the first lock switching valve and shifting the first lock switching valve from the second position to the first position when the pressure of the pilot hydraulic source is introduced to the third pressure receiving section, the second lock switching valve connecting the pilot line to both the pilot valves and the third pressure receiving section when the second lock switching valve is in the third position, cutting off the connection between the pilot line and both the pilot valves and the third pressure receiving section when the second lock. switching valve is in the fourth position, and cutting of the connection between the pilot line and the pilot valves and connecting the pilot line to the third pressure receiving section when the second lock switching valve is in the fifth position.

With those features, when the second lock switching valve is shifted from the third position to the fourth position, the connection between the pilot line and the pilot valves is cut off and the operating means can no longer generate the pilot control pressure. Therefore, the actuator associated with the other directional control valve than the particular one can be locked. At the same time, the connection between the pilot line and the third pressure receiving section of the first lock switching valve is cut off and the first lock switching valve is shifted from the first position to the second position in interlock with the shifting of the second lock switching valve. Therefore, the actuator associated with the particular directional control valve can be locked as mentioned in the above (1).

Further, when the second lock switching valve is shifted to the fifth position, the connection between the pilot line and the pilot valves is cut off, and hence the actuator associated with the other directional control valve than the particular one can be locked. On the other hand, since the pilot line is connected to the third pressure receiving section of the first lock switching valve, the first lock switching valve takes the first position and the pressure of the hydraulic supply source is no longer introduced to the first pressure receiving section of the first pressure compensating valve. Accordingly, the first pressure compensating valve is not fully closed and is capable of operating usually, whereby only the actuator associated with the particular directional control valve can be unlocked. In other words, it is possible to lock the actuator associated with the other directional control valve than the particular one, and to selectively unlock only the actuator associated with the particular directional control valve.

(7) In the above (6), preferably, the hydraulic drive system further comprises a second pressure receiving section provided at an end of the second pressure compensating valve on the, side acting in the closing direction, and connected to the, output side of the first lock switching valve.

With that feature, as mentioned in the above (4), for the actuator associated with the other directional control valve than the particular one, dual lock functions of locking the actuator are provided by locking both the other directional control valve and the second pressure compensating valve.

(8) In the above (1) or (2), preferably, the hydraulic drive system further comprises a pilot hydraulic source; operating means connected to the pilot hydraulic source via a pilot line, generating the pilot control pressure based on a hydraulic pressure of the pilot hydraulic source, and including pilot valves for driving the other directional control valve than the particular one; a second lock switching valve disposed in the pilot line, having third and fourth shift positions, and cutting off the pilot line when the second lock switching valve is shifted from the third position to the fourth position, the second lock switching valve being operated by an operator; and lock operating means enabling the first lock switching valve to be shifted between the first position and the second position when the second lock switching valve is in the fourth position.

With those features, when the second lock switching valve is shifted from the third position to the fourth position by the lock operating means, the pilot line is cut off and the operating means can no longer generate the pilot control pressure. Therefore, the actuator associated with the other directional control valve than the particular one can be locked. Also, by shifting the first lock valve from the first position to the second position at that time, the actuator associated with the particular directional control valve can be locked as mentioned in the above (1).

Further, when the first lock switching valve is shifted to the first position by the lock operating means in a condition of the second lock switching valve being in the fourth position, the pressure of the hydraulic supply source is no longer introduced to the first pressure receiving section of the first pressure compensating valve. Accordingly, the first pressure compensating valve is not fully closed and is capable of operating usually, whereby only the actuator associated with the particular directional control valve can be unlocked. In other words, it is possible to lock the actuator associated with the other directional control valve than the particular one, and to selectively unlock only the actuator associated with the particular directional control valve.

(9) In the above (8), preferably, the hydraulic drive system further comprises a third lock switching valve having sixth and seventh shift positions and outputting the pressure of the hydraulic supply source when the third lock switching valve is shifted from the sixth position to the seventh position; interlock switching means for shifting the third lock switching valve from the sixth position to the seventh position in interlock with shifting of the second lock switching valve from the third position to the fourth position; and a second pressure receiving section provided at an end of the second pressure compensating valve on the side acting in the closing direction, and connected to the output side of the third lock switching valve.

With that feature, as mentioned in the above (4), for the actuator associated with the other directional control valve than the particular one, dual lock functions of locking the actuator are provided by locking both the other directional control valve and the second pressure compensating valve.

(10) In the above (8), preferably, the first and second lock switching valves are mechanically shifted valves directly shifted by control levers, and the lock operating means includes the control levers.

(11) In the above (8), preferably, the first and second lock switching valves may be solenoid-shifted valves shifted by electrical signals. In this case, the lock operating means includes a controller for generating the electrical signals.

BRIEF DESCRIPTION OF THE DRAWINGS

FIG. 9 is a table showing processing details of a controller used in the hydraulic drive system according to the seventh embodiment of the present invention shown in FIG. 8.

BEST MODE FOR CARRYING OUT THE INVENTION

Embodiments of the present invention will be described below with reference to the drawings.

Figure 1:
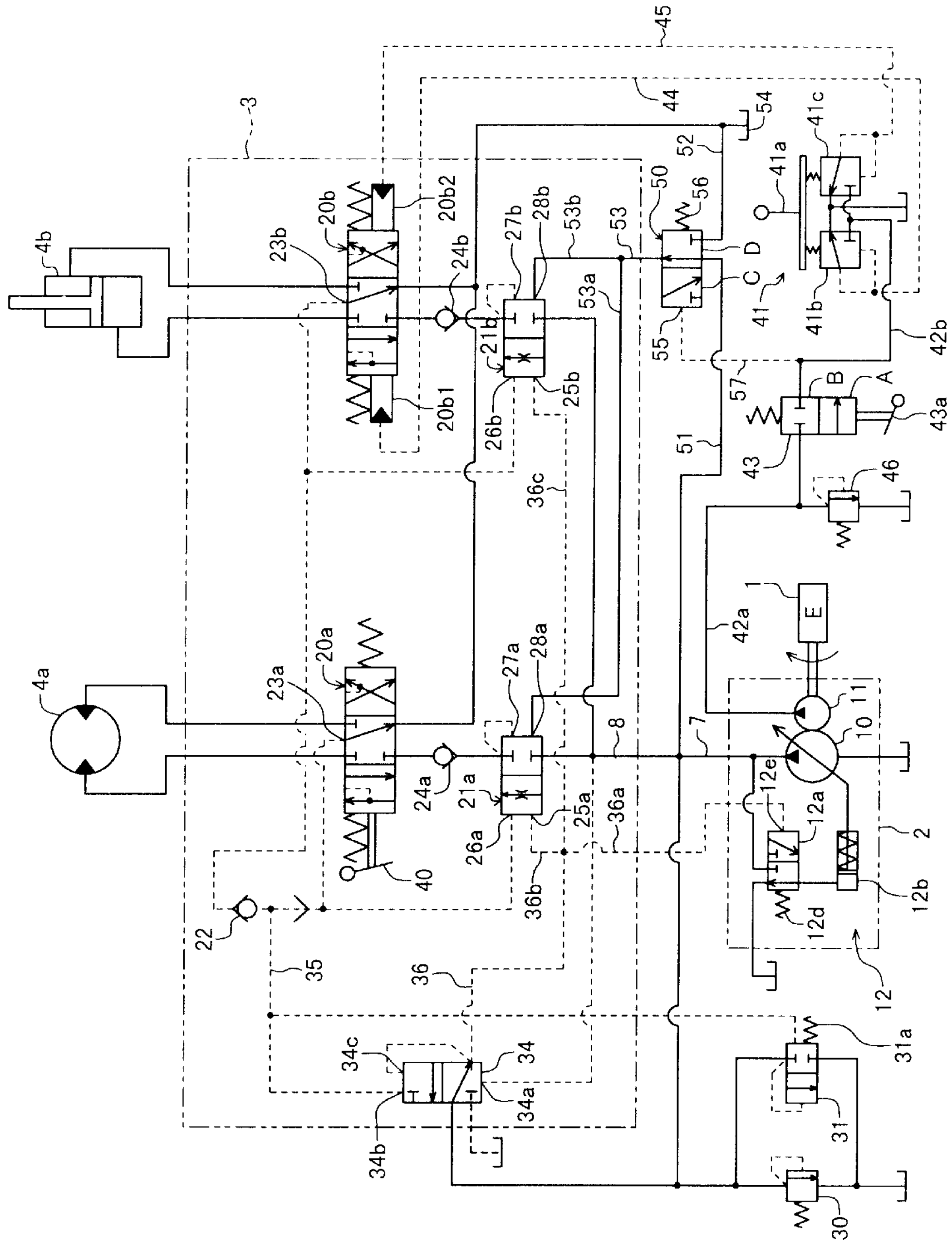
FIG. 1 is a diagram showing a hydraulic drive system according to a first embodiment of the present invention.

FIG. 1 shows a hydraulic drive system according to a first embodiment of the present invention.

Referring to FIG. 1, the hydraulic drive system of this embodiment comprises an engine 1, a hydraulic source 2, a valve unit 3, and a plurality of actuators 4*a*, 4*b*.

The hydraulic source 2 includes a variable displacement hydraulic pump 10, a fixed displacement pilot pump 11, these pumps being both driven by the engine 1, and an LS control regulator 12 for controlling a tilting (displacement) of the hydraulic pump 10. The LS control regulator 12 comprises an LS control valve 12*a* and an LS control tilting actuator 12*b*, which cooperatively perform load sensing control so that a delivery pressure of the hydraulic pump 10 is held higher than a maximum load pressure of a plurality of actuators 4*a*, 4*b* by a target differential pressure.

The LS control valve 12*a* includes a spring 12*d* for setting the target LS target differential pressure, which is provided at the end on the side acting to reduce a pressure supplied to the actuator 12*b* and to increase the tilting of the hydraulic pump 10, and a pressure receiving section 12*e* provided at the end on the side acting to increase the pressure supplied to the actuator 12*b* and to reduce the tilting of the hydraulic pump 10. An output pressure (differential pressure between the delivery pressure of the hydraulic pump 10 and the maximum load pressure, i.e., LS differential pressure) of an LS differential pressure generating valve 34 (described later)

is introduced, as a load sensing control signal pressure, to the pressure receiving section 12*e*.

The valve unit 3 comprises a plurality of closed center directional control valves 20*a*, 20*b*, a plurality of pressure compensating valves 21*a*, 21*b*, load check valves 24*a*, 24*b* interposed between the directional control valves 20*a*, 20*b* and the pressure compensating valves 21*a*, 21*b*, a shuttle valve 22 constituting a part of a maximum load pressure detecting circuit, and the aforementioned LS differential pressure generating valve 34.

The directional control valves 20*a*, 20*b* are connected to a hydraulic fluid supply line 8 leading to a delivery line 7 of the hydraulic pump 2, and control flow rates and directions of the hydraulic fluid supplied from hydraulic pump 10 to the actuators 4*a*, 4*b*. Also, the directional control valves 20*a*, 20*b* have load ports 23*a*, 23*b* for taking out load pressures of the actuators 4*a*, 4*b* when they are driven. The load pressures taken out at the load ports 23*a*, 23*b* are introduced to respective input ports of the shuttle valve 22, and the maximum load pressure is detected, as a signal pressure, in a maximum load pressure line 35 connected to an output port of the shuttle valve 22.

The LS differential pressure generating valve 34 is a differential pressure detecting valve for outputting, as an absolute pressure, a differential pressure between a pressure in the hydraulic fluid supply line 8 (i.e., the delivery pressure of the hydraulic pump 10) and a pressure in the maximum load pressure line 35 (i.e., the maximum load pressure). The LS differential pressure generating valve 34 has a pressure receiving section 34*a* provided at the end on the side acting in the pressure increasing direction, and pressure receiving sections 34*b*, 34*c* provided at the end on the side acting in the pressure reducing direction. The pressure in the hydraulic fluid supply line 8 is introduced to the pressure receiving section 34*a*, whereas the pressure in the maximum load pressure line 35 (i.e., the maximum load pressure) and an output pressure of the LS differential pressure generating valve 34 itself are introduced respectively to the pressure receiving sections 34*b*, 34*c*. Under balance among those introduced pressures, the LS differential pressure generating valve 34 generates a pressure equal to the differential pressure (LS differential pressure) between the pressure in the hydraulic fluid supply line 8 and the pressure in the maximum load pressure line 35 (i.e., the maximum load pressure) based on the delivery pressure of the hydraulic pump 10, and then outputs the generated pressure to a signal pressure line 36. The output pressure of the LS differential pressure generating valve 34 is introduced to the pressure receiving section 12*e* of the LS control valve 12*b* via a signal pressure line 36*a*, and is also introduced to pressure receiving sections 25*a*, 25*b* of the pressure compensating valves 21*a*, 21*b* via signal pressure lines 36*b*, 36*c*.

The above-described construction for outputting, as an absolute pressure, the LS differential pressure by using the LS differential pressure generating valve 34 is based on the invention disclosed in JP,A 10-89304.

The pressure compensating valves 21*a*, 21*b* are disposed respectively upstream of meter-in throttles of the directional control valves 20*a*, 20*b*, and make control such that differential pressures across the meter-in throttles are kept equal to each other. To that end, the pressure compensating valves 21*a*, 21*b* have respectively the aforesaid pressure receiving sections 25*a*, 25*b* and other pressure receiving sections 26*a*, 26*b* at the ends on the side acting in the opening direction, and pressure receiving sections 27*a*, 27*b* at the ends on the side acting in the closing direction. The output pressure of the LS differential pressure generating valve 34 (i.e., the LS differential pressure) is introduced to the pressure receiving sections 25*a*, 25*b*. The load pressures of the actuators 4*a*, 4*b* (i.e., the pressures downstream of the meter-in throttles of the directional control valves 20*a*, 20*b*) taken out at the load ports 23*a*, 23*b* of the directional control valves 20*a*, 20*b* are introduced to the pressure receiving sections 26*a*, 26*b*. Pressures upstream of the meter-in throttles of the directional control valves 20*a*, 20*b* are introduced to the pressure receiving sections 27*a*, 27*b*. Then, in accordance with the output pressure of the LS differential pressure generating valve 34 (i.e., the LS differential pressure) introduced to the pressure receiving sections 25*a*, 25*b*, the pressure compensating valves 21*a*, 21*b* set that introduced output pressure as a target compensated differential pressure, and control differential pressures across the directional control valves 20*a*, 20*b* so as to be kept equal to the target compensated differential pressure.

By constructing the pressure compensating valves 21*a*, 21*b* as described above, during the combined operation in which the plurality of actuators 4*a*, 4*b* are simultaneously driven, the hydraulic fluid can be supplied to the actuators at a ratio depending on opening areas of the meter-in throttles of the directional control valves 20*a*, 20*b* regardless of the magnitudes of load pressures. Also, even when a saturation state, where a delivery rate of the hydraulic pump 10 is insufficient for satisfying a flow rate demanded by the directional control valves 20*a*, 20*b*, occurs during the combined operation, the LS differential pressure is lowered depending on a degree of saturation, and the target compensated differential pressure for each of the pressure compensating valves 21*a*, 21*b* is also reduced correspondingly. Therefore, the delivery rate of the hydraulic pump 10 can be redistributed at a ratio of flow rates demanded by the actuators 4*a*, 4*b*.

Further, the pressure compensating valves 21*a*, 21*b* have pressure receiving sections 28*a*, 28*b* provided at the ends on the side acting in the closing direction (as described later).

Moreover, connected to the delivery line 7 of the hydraulic pump 10 are a main relief valve 30 for restricting an upper limit of the delivery pressure of the hydraulic pump 10, and an unloading valve 31 for limiting the differential pressure between the delivery pressure of the hydraulic pump 10 and the maximum load pressure to a value slightly larger than the target LS differential pressure that is set by a spring 31*a*.

The actuator 4*a* is an actuator for, e.g., a track motor or a front attachment other than the bucket, and the directional control valve 20*a* is of the mechanically shifted type having a spool directly driven by a control lever 40. The actuator 4*b* is an arm cylinder, for example, and the directional control valve 20*b* is of the pilot shifted type that pressure receiving sections 20*b*1, 20*b*2 are provided at both ends of a spool and the spool is driven by a pilot control pressure supplied from a control lever device 41.

The control lever device 41 comprises a control lever 41*a* and a pair of pilot valves (pressure reducing valves) 41*b*, 41*c*. A primary side port of each of the pilot valves 41*b*, 41*c* is connected to the pilot pump 11 via a pilot line 42*a*, a pilot lock switching valve 43, and a pilot line 42*b*, while secondary side ports of the pilot valves 41*b*, 41*c* are connected to the pressure receiving sections 20*b*1, 20*b*2 of the directional control valve 20*b* via pilot lines 44, 45. A relief valve 46 for holding constant a delivery pressure of the pilot pump 11 is disposed in the pilot line 42*a*. When the control lever 41*a* is manipulated, one of the pilot valves 41*b*, 41*c* is operated depending on the direction in which the control lever 41*a* is manipulated, and outputs, as a pilot control pressure, a pressure depending on the input amount of the manipulated control lever 41*a* based on the delivery pressure of the pilot pump 11.

The pilot lock switching valve 43 is a two-way on/off valve disposed between the pilot lines 42*a*, 42*b*, and can be switched over between two positions, i.e., an open position A (unlock position) on the lower side as viewed in the drawing and a closed position B (lock position) on the upper side as viewed in the drawing. When the pilot lock switching valve 43 is in the lower open position A as viewed in the drawing, the pilot lines 42*a*, 42*b* are communicated with each other. When the pilot lock switching valve 43 is shifted from the lower open position A to the upper closed position B as viewed in the drawing, the communication between the pilot lines 42*a*, 42*b* is cut off. The pilot lock switching valve 43 is usually in the lower open position A as viewed in the drawing, whereby the delivery pressure of the pilot pump 11 is supplied to the pilot line 42*b*. Accordingly, the control lever device 41 can produce the pilot control pressure upon manipulation of the control lever 41*a*, as described above, for driving the directional control valve 20*b*.

Further, the pilot lock switching valve 43 is of the mechanically shifted type having a spool directly driven by a control lever 43*a*. By holding the control lever 43*a* on a latch mechanism (not shown), the pilot lock switching valve 43 is held in the lower open position A as viewed in the drawing. Thereby, as mentioned above, the delivery pressure of the pilot pump 11 is supplied to the pilot line 42*b* so that the control lever device 41 can produce the pilot control pressure upon manipulation of the control lever 41*a* and can drive the directional control valve 20*b*.

The control lever 43*a* is, for example, a gate lock lever provided at a doorway of a hydraulic excavator's cab in such a manner as to be able to open and close. The lower open position A as viewed in the drawing corresponds to a state where the gate lock lever is descended (state where the doorway is blocked off), and the upper closed position B as viewed in the drawing corresponds to a state where the gate lock lever is ascended (state where the doorway is opened).

In addition to the above-described construction, the hydraulic drive system of this embodiment includes an actuator lock switching valve 50. The actuator lock switching valve 50 is a 3-port, 2-position switching valve disposed between a pilot line 51 and a drain line 52 on one side and a pilot line 53 on the other side. The actuator lock switching valve 50 can be switched over between two positions, i.e., a left-hand position C (unlock position) and a right-hand position D (lock position) as viewed in the drawing. When the actuator lock switching valve 50 is in the left-hand position C as viewed in the drawing, the communication between the pilot lines 51, 53 is cut off and the drain line 52 and the pilot line 53 are communicated with each other. When the actuator lock switching valve 50 is shifted to the right-hand position D as viewed in the drawing, the pilot lines 51, 53 are communicated with each other and the communication between the drain line 52 and the pilot line 53 is cut off. The pilot line 51 is connected to the delivery line 7 of the hydraulic pump 10, and the drain line 52 is connected to a reservoir 54. The pilot line 53 is branched to pilot lines 53*a*, 53*b* which are connected respectively to the pressure receiving sections 28*a*, 28*b* provided at the ends of the pressure compensating valves 21*a*, 21*b* on the side acting in the closing direction.

Further, the actuator lock switching valve 50 has a pressure receiving section 55 at the end on the same side as the left-hand position C as viewed in the drawing, and a spring 56 at the end on the same side as the right-hand position D as viewed in the drawing. The pressure receiving section 55 is connected to the pilot line 42*b* via a signal pressure line 57. A pressure bearing area of the pressure receiving section 55 and a spring constant of the spring 56 are set such that the actuator lock switching valve 50 is shifted to the left-hand position C as viewed in the drawing when the delivery pressure of the pilot pump 11 is supplied to the pressure receiving section 55, and it is shifted to the right-hand position D as viewed in the drawing when the pressure in the signal pressure line 57 is reduced down to a reservoir pressure.

The operation of the thus-constructed hydraulic drive system of this embodiment will be described below.

When the pilot lock switching valve 43 is in the lower position A as viewed in the drawing, the delivery pressure of the pilot pump 11 is supplied to the pilot line 42*b*, and the control lever device 41 is in a state capable of outputting the pilot control pressure. Therefore, when the control lever 41*a* is manipulated, the directional control valve 20*b* is shifted depending on the direction and the input amount in and by which the control lever 41*a* is manipulated.

Also, the actuator lock switching valve 50 is in the left-hand position C as viewed in the drawing, and the pressure receiving sections 28*a*, 28*b* of the pressure compensating valves 21*a*, 21*b* are held at the reservoir pressure. Accordingly, when the directional control valves 20*a*, 20*b* are operated at the same time, the hydraulic fluid delivered from the hydraulic pump 10 driven by the engine 1 is supplied, as described above, to the actuators 4*a*, 4*b* at a distribution ratio depending on opening areas of the meter-in throttles of the directional control valves 20*a*, 20*b* regardless of the magnitudes of load pressures of the actuators 4*a*, 4*b* and even in the case of a saturation state where the delivery rate of the hydraulic pump 10 is insufficient for satisfying a demanded flow rate. As a result, the combined operation can be satisfactorily performed.

When the pilot lock switching valve 43 is shifted to the upper position B as viewed in the drawing, the supply of the hydraulic fluid from the pilot pump 11 to the pilot line 42*b* is cut off, and the control lever device 41 can no longer output the operation pilot pressure even with the Control lever 41*a* manipulated. Further, the pressure in the pilot line 42*b* lowers with the lapse of time or when the control lever 41*a* of the control lever device 41 is manipulated. Hence, the actuator lock switching valve 50 is shifted to the right-hand position D as viewed in the drawing, and the delivery pressure of the hydraulic pump 10 is supplied to the pressure receiving sections 28*a*, 28*b* of the pressure compensating valves 21*a*, 21*b*.

Assuming here that the output pressure of the LS differential pressure generating valve 34 (i.e., the LS differential pressure) acting upon the pressure receiving section 25*a* of the pressure compensating valve 21*a* is Ps, the load pressure of the actuator 4*a* (i.e., the pressure downstream of the meter-in throttle of the directional control valve 20*a*) acting upon the pressure receiving section 26*a* thereof is Pl, the pressure upstream of the meter-in throttle of the directional control valves 20*a* acting upon the pressure receiving section 27*a* thereof is Pi, the output pressure of the actuator lock switching valve 50 acting upon the pressure receiving section 28*a* thereof is Pr, and the delivery pressure of the hydraulic pump 10 is Pp, the pressure compensating valve 21*a* is subjected to a pressure (Ps+Pl) at the end on the side acting in the opening direction and a pressure (Pi+Pp) at the end on the side acting in the closing direction because of $Pr=Pp$. Assuming now the maximum load pressure to be PLmax, $Ps \leqq Pp$ is resulted from $Ps=Pp-PLmax$ and $PLmax \geqq 0$. Also, $Pl<Pi$ is resulted due to a pressure loss caused by the meter-in throttle of the directional control valve 20*a*. Therefore, the relationship among the pressures acting upon the spool of the pressure compensating valve 21*a* is expressed by $(Ps+Pi)<(Pi+Pp)$. Accordingly, the pressure compensating valve 21*a* is fully closed, whereby the hydraulic fluid no longer flows into the actuator 4*a* and hence the actuator 4*a* will not be driven even with the directional control valve 20*a* operated. In other words, the actuator 4*a* can be held locked by locking the pressure compensating valve 21*a*.

Likewise, the pressure compensating valve 21*b* is fully closed because the above-described pressure relationship is also applied to the pressure compensating valve 21*b*. On the side of the actuator 4*b*, therefore, the actuator 4*b* is prevented from being driven due to not only that the control lever device 41 can no longer output the pilot control pressure and the directional control valve 20*b* is incapable of being shifted as described above, but also that the hydraulic fluid no longer flows into the actuator 4*b* because the pressure compensating valve 21*b* is fully closed even if the directional control valve 20*b* should be moved. Thus, the actuator 4*b* can be held locked by dual lock functions of locking both the directional control valve 20*b* and the pressure compensating valve 21*b*.

$Pl<Pi$ is assumed in the above description. On the side of the mechanically shifted directional control valve 20*a*, however, the actuator 4*a* is a one, such as a track motor, which may raise a holding pressure when it is stopped. When a high holding pressure is sustained during the standstill of the actuator (e.g., when the excavator is stopped on a slope and the holding pressure caused by the track motor for maintaining such a condition is high), the relationship of $Pl>Pi$ may occur upon the control lever 40 being falsely manipulated to shift the directional control valve 20*a* from its neutral position, because the high holding pressure acts upon as the load pressure Pl only the pressure receiving section 26*a* by the presence of the load check valve 24*a*. Even in such a case, with this embodiment, the delivery pressure of the hydraulic pump 10 under the load sensing control is introduced to the pressure receiving section 28*a* and the relationship of $Pl+Ps=Pp$ is held. Hence, $(Ps+Pl)<(Pi+Pp)$ is resulted and the pressure compensating valve 21*a* is fully closed.

Additionally, when the actuator 4*a* is an actuator such as an actuator for the front attachment, for which $Pl<Pi$ is always held, the relationship of $(Ps+Pl)<(Pi+Pr)$ is resulted if $Ps \leqq Pr$, and the pressure compensating valve 21*a* is fully closed. In that case, therefore, the pressure introduced to the pressure receiving section 28*a* of the pressure compensating valve 21*a* for locking the actuator may be a pressure from any hydraulic fluid supply source other than the delivery pressure of the hydraulic pump 10 so long as $Ps \leqq Pp$ is satisfied. For example, the LS differential pressure Ps is usually about 15 $Kg/cm^2$, and the delivery pressure of the pilot pump 11 is usually about 50 $Kg/cm^2$. Therefore, the delivery pressure of the pilot pump 11 may be used as the pressure introduced to the pressure receiving section 28*a* of the pressure compensating valve 21*a*. For the side of the actuator 4*b*, it is a basic condition that the control lever device 41 can be no longer operated, the directional control valve 20*b* is held in its neutral position, and $Pl<Pi$ is maintained. Hence, there is no problem in employing a pressure from any hydraulic fluid supply source, such as the delivery pressure of the pilot pump 11.

With this embodiment described above, even when the directional control valve 20*a* of the actuator 4*a* is a mechanically shifted valve, the actuator 4*a* can be locked and malfunctions of the actuators 4*a*, 4*b* can be prevented when they are in an inoperative condition while the engine 1 is being driven. Also, the pressure receiving sections 28*a*, 28*b* of the pressure compensating valves 21*a*, 21*b* can be provided by using pressure receiving sections that are originally provided in the pressure compensating valves for drain passages. Therefore, the actuator 4*a* can be locked with a simple construction just requiring addition of the actuator lock switching valve 50. Further, since a main passage for supplying the hydraulic fluid to the actuator 4a therethrough is cut off, the actuator 4*a* can be reliably locked.

For the actuator 4*b*, the dual lock functions of locking both the directional control valve 20*b* and the pressure compensating valve 21*b* is provided. Therefore, the actuator 4*b* can be more reliably locked.

Moreover, even when a mechanically shifted directional control valve for a front attachment is added to employ an additional attachment such as a crusher, it is possible to add the function of locking an actuator for the attachment with a simple construction by introducing the output pressure of the actuator lock switching valve 50 to an associated pressure compensating valve.

In addition, even when the actuator 4*a* on the side of the mechanically shifted directional control valve 23*a* is an actuator such as a track motor, which may raise a holding pressure and bring about the relationship of $Pl>Pi$ when it is stopped, the actuator 4*a* can be locked and malfunctions of the actuators 4*a*, 4*b* can be prevented when they are in an inoperative condition while the engine 1 is being driven.

Figure 2:
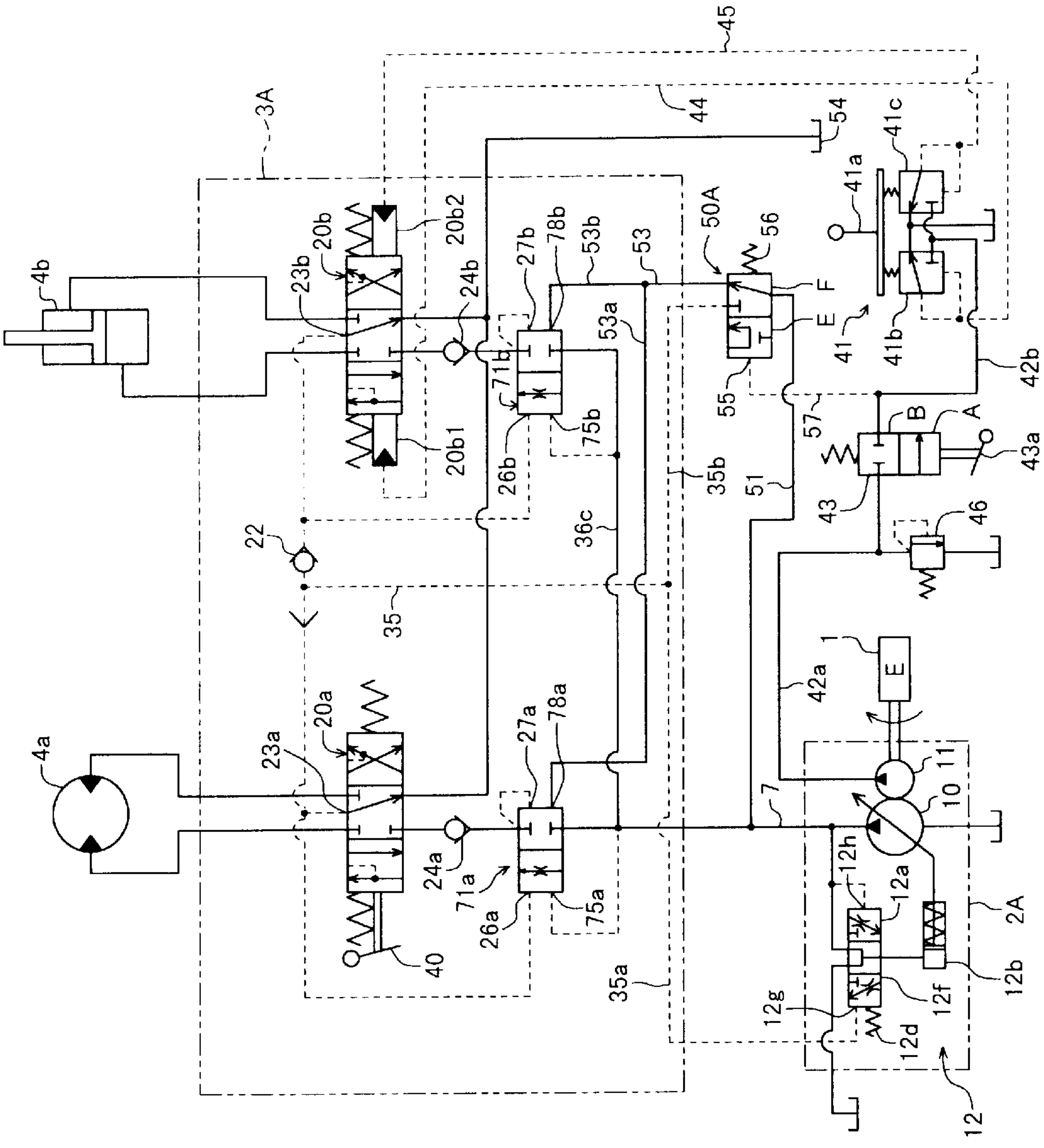
FIG. 2 is a diagram showing a hydraulic drive system according to a second embodiment of the present invention.

A second embodiment of the present invention will be described with reference to FIG. 2. In FIG. 2, identical components to those shown in FIG. 1 are denoted by the same reference numerals. In this embodiment, an actuator on the side of a mechanically shifted directional control valve is a one, which does not raise a holding pressure when it is stopped and which maintains the relationship of $Pl<Pi$, like an actuator for the front attachment.

In FIG. 2, a hydraulic drive system of this embodiment comprises a hydraulic source 2A, a valve unit 3A, and an actuator lock switching valve 50A. These components have different constructions from those in the first embodiment.

More specifically, in the hydraulic source 2A, an LS control valve 12*f* of an LS control regulator 12A had a different construction from that in the first embodiment. The LS control valve 12*f* includes a spring 12*d* for setting the target LS target differential pressure and a pressure receiving section 12*g*, which are provided at the end on the side acting to reduce a pressure supplied to the actuator 12*b* and to increase the tilting of the hydraulic pump 10, and a pressure receiving section 12*h* provided at the end on the side acting to increase the pressure supplied to the actuator 12*b* and to reduce the tilting of the hydraulic pump 10. The maximum load pressure detected in the maximum load pressure line 35 by the shuttle valve 22 is introduced to the pressure receiving section 12*g* via the signal pressure line 35*a*, and the delivery pressure of the hydraulic pump 10 is introduced to the pressure receiving section 12*h*.

The valve unit 3A does not include the LS differential pressure generating valve 34 provided in the first embodiment, and signal pressures introduced to pressure receiving sections of the pressure compensating valve 71*a*, 71*b* differ from those in the first embodiment. In the pressure compensating valves 71*a*, 71*b*, similarly to the first embodiment, the load pressures of the actuators 4*a*, 4*b* (i.e., the pressures downstream of the meter-in throttles of the directional control valves 20*a*, 20*b*) are introduced to their pressure receiving sections 26*a*, 26*b* at the ends on the side acting in the opening direction, and the pressures upstream of the meter-in throttles of the directional control valves 20*a*, 20*b* are introduced to their pressure receiving sections 27*a*, 27*b* at the ends on the side acting in the closing direction. Unlike the first embodiment, however, the delivery pressure of the hydraulic pump 10 is introduced to pressure receiving sections 75*a*, 75*b* of the pressure compensating valves 71*a*, 71*b* at the ends on the side acting in the opening direction, and an output pressure of the actuator lock switching valve 50A is introduced to pressure receiving sections 78*a*, 78*b* thereof at the ends on the side acting in the closing direction.

The actuator lock switching valve 50A is a 3-port, 2-position switching valve disposed between a pilot line 51 and pilot lines 35*b*, 53. When the actuator lock switching valve 50A is in a left-hand position E as viewed in the drawing, the communication between the pilot lines 51, 53 is cut off and the pilot lines 35*b*, 53 are communicated with each other. When the actuator lock switching valve 50 is, shifted to a right-hand position F as viewed in the drawing, the pilot line 51, 53 are communicated with each other and the communication between the pilot lines 35*b*, 53 is cut off. The pilot line 35*b* is a signal pressure line branched from the maximum load pressure line 35. The construction of the actuator lock switching valve 50A is similar to that in the first embodiment in points that it has a pressure receiving section 55 at the end on the same side as the left-hand position E as viewed in the drawing, and a spring 56 at the end on the same side as the right-hand position F as viewed in the drawing, and that the pressure receiving section 55 is connected to the pilot line 42*b* via a signal pressure line 57.

In the thus-constructed hydraulic drive system of this embodiment, when the pilot lock switching valve 43 is in the lower position A as viewed in the drawing, the delivery pressure of the pilot pump 11 is supplied to the pilot line 42*b*, and the control lever device 41 is in a state capable of outputting the pilot control pressure. Therefore, when the control lever 41*a* is manipulated, the directional control valve 20*b* is shifted depending on the direction and the input amount in and by which the control lever 41*a* is manipulated.

Also, the actuator lock switching valve 50A is in the left-hand position E as viewed in the drawing, and the maximum load pressure is introduced to the pressure receiving sections 78*a*, 78*b* of the pressure compensating valves 71*a*, 71*b*. Accordingly, a differential pressure between the pump delivery pressure introduced to the pressure receiving sections 75*a*, 75*b* of the pressure compensating valves 71*a*, 71*b* and the maximum load pressure introduced to the pressure receiving sections 78*a*, 78*b* thereof, i.e., an LS differential pressure, is set as the target compensated differential pressure. Then, when the directional control valves 20*a*, 20*b* are operated at the same time, the hydraulic fluid delivered from the hydraulic pump 10 driven by the engine 1 is supplied, as with the first embodiment, to the actuators 4*a*, 4*b* at a distribution ratio depending on opening areas of the meter-in throttles of the directional control valves 20*a*, 20*b* regardless of the magnitudes of load pressures of the actuators 4*a*, 4*b* and even in the case of a saturation state where the delivery rate of the hydraulic pump 10 is insufficient for satisfying a demanded flow rate. As a result, the combined operation can be satisfactorily performed.

When the pilot lock switching valve 43 is shifted to the upper position B as viewed in the drawing, the supply of the hydraulic fluid from the pilot pump 11 to the pilot line 42*b* is cut off, and the control lever device 41 can no longer output the operation pilot pressure even with the control lever 41*a* manipulated. Further, the pressure in the pilot line 42*b* lowers with the lapse of time or when the control lever 41*a* of the control lever device 41 is manipulated, and the actuator lock switching valve 50A is shifted to the right-hand position F as viewed in the drawing. Hence, the delivery pressure of the hydraulic pump 10 is supplied to the pressure receiving sections 78*a*, 78*b* of the pressure compensating valves 71*a*, 71*b*.

Assuming here that, as with the first embodiment, the pump delivery pressure acting upon the pressure receiving sections 75*a*, 78*a* of the pressure compensating valve 71*a* is Pp, the load pressure of the actuator 4*a* (i.e., the pressure downstream of the meter-in throttle of the directional control valve 20*a*) acting upon the pressure receiving section 26*a* thereof is Pl, the pressure upstream of the meter-in throttle of the directional control valves 20*a* acting upon the pressure receiving section 27*a* thereof is Pi, and the output pressure of the actuator lock switching valve 50A acting upon the pressure receiving section 78*a* thereof is Pr, the pressure compensating valve 71*a* is subjected to a pressure (Pp+Pl) at the end on the side acting in the opening direction and a pressure (Pi+Pp) at the end on the side acting in the closing direction because of Pr=Pp. At this time, since Pl<Pi is resulted due to a pressure loss caused by the meter-in throttle of the directional control valve 20*a*, the relationship among the pressures acting upon a spool of the pressure compensating valve 71*a* is expressed by (Pp+Pl)<(Pi+Pp). Accordingly, the pressure compensating valve 71*a* is fully closed, whereby the hydraulic fluid no longer flows into the actuator 4*a* and hence the actuator 4*a* will not be driven even with the directional control valve 20*a* operated. In other words, the actuator 4*a* can be held locked by locking the pressure compensating valve 71*a*.

Likewise, the pressure compensating valve 71*b* is fully closed because the above-described pressure relationship is also applied to the pressure compensating valve 71*b*. On the side of the actuator 4*b*, therefore, the actuator 4*b* is prevented from being driven due to not only that the control lever device 41 can no longer output the pilot control pressure and the directional control valve 20*b* is incapable of being shifted as described above, but also that the hydraulic fluid no longer flows into the actuator 4*b* because the pressure compensating valve 71*b* is fully closed even if the directional control valve 20*b* should be moved. Thus, the actuator 4*b* can be held locked by dual lock functions of locking both the directional control valve 20*b* and the pressure compensating valve 71*b*.

Accordingly, this embodiment can also provide similar advantages to those in the first embodiment in the hydraulic drive system wherein the actuator 4*a* on the side of the mechanically shifted directional control valve 20*a* is a one, which does not raise a holding pressure when it is stopped and which maintains the relationship of Pl<Pi, like an actuator for the front attachment.

Figure 3:
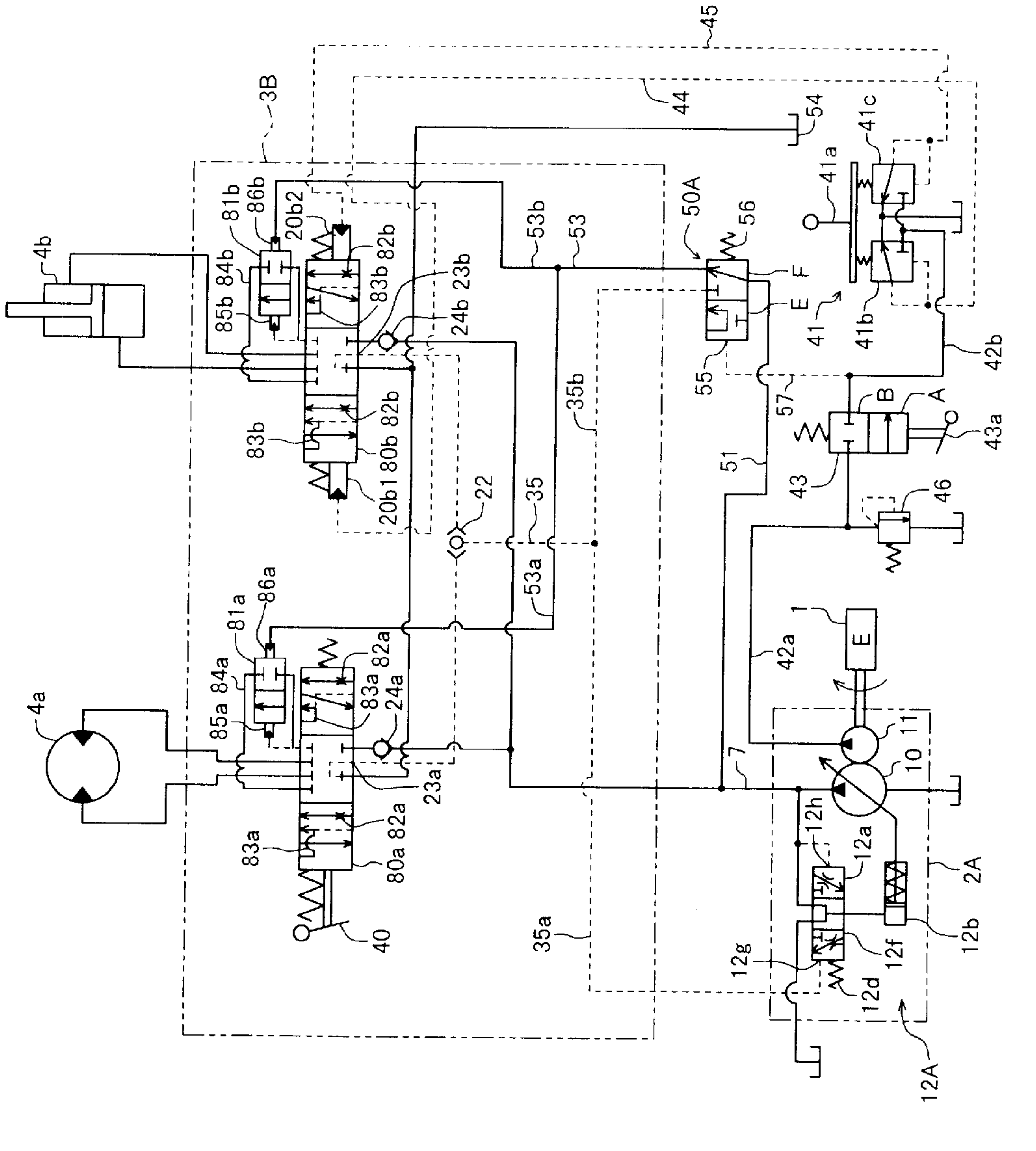
FIG. 3 is a diagram showing a hydraulic drive system according to a third embodiment of the present invention.

A third embodiment of the present invention will be described with reference to FIG. 3. In FIG. 3, identical components to those shown in FIGS. 1 and 2 are denoted by the same reference numerals. While the first and second embodiments employ a pressure compensating valve of the before orifice type being disposed upstream of the meter-in throttle of the directional control valve, this embodiment employs a pressure compensating valve of the after orifice type being disposed downstream of the meter-in throttle of the directional control valve.

In FIG. 3, numeral 3B denotes a valve unit used in this embodiment. The valve unit 3B comprises a plurality of closed center directional control valves 80*a*, 80*b*, a plurality of pressure compensating valves 81*a*, 81*b*, load check valves 24*a*, 24*b*, and a shuttle valve 22.

The directional control valves 80*a*, 80*b* include, in separate fashion, flow rate control sections 82*a*, 82*b* having meter-in throttles, and directional control sections 83*a*, 83*b* located downstream of the flow rate control sections 82*a*, 82*b*, respectively. The flow rate control sections 82*a*, 82*b* and the directional control valves 83*a*, 83*b* are connected to each other by feeder passages 84*a*, 84*b*. The pressure compensating valves 81*a*, 81*b* are connected to the feeder passages 84*a*, 84*b* downstream of the flow rate control sections 82*a*, 82*b*.

Also, the directional control valves 80*a*, 80*b* have the load ports 23*a*, 23*b*, and a higher one of the load pressures taken out at the load ports 23*a*, 23*b* is taken by the shuttle valve 22 and then detected, as a signal pressure, in the maximum load pressure line 35. This arrangement is the same as that in the foregoing embodiments.

The pressure compensating valves 81*a*, 81*b* make control such that pressures downstream of the flow rate control sections 82*a*, 82*b* of the directional control valves 80*a*, 80*b* are kept equal to each other, and hence such that differential pressures across the meter-in throttles of the flow rate control sections 82*a*, 82*b* are kept equal to each other. To that end, the pressure compensating valves 81*a*, 81*b* have respectively pressure receiving sections 85*a*, 85*b* at the ends on the side acting in the opening direction, and pressure receiving sections 86*a*, 86*b* at the ends on the side acting in the closing direction. The pressures downstream of the flow rate control sections 82*a*, 82*b* are introduced respectively to the pressure receiving sections 85*a*, 85*b*, and the output pressure of the actuator lock switching valve 50A is introduced to the pressure receiving sections 86*a*, 86*b*.

The actuator lock switching valve 50A is of the same construction as that in the second embodiment shown in FIG. 2.

In the thus-constructed hydraulic drive system of this embodiment, when the pilot lock switching valve 43 is in the lower position A and the actuator lock switching valve 50A is in the left-hand position E as viewed in the drawing, the maximum load pressure detected by the shuttle valve 22 is introduced to the pressure receiving sections 86*a*, 86*b* of the pressure compensating valves 81*a*, 81*b*, whereby the pressures downstream of-the flow rate control sections 82*a*, 82*b* of the directional control valves 80*a*, 80*b* are controlled to be kept equal to each other, and hence the differential pressures across the meter-in throttles of the flow rate control sections 82*a*, 82*b* are controlled to be kept equal to each other. Herein, the differential pressures across the meter-in throttles of the flow rate control sections 82*a*, 82*b* become substantially equal to the differential pressure between the pump delivery pressure and the maximum load pressure, i.e., the LS differential pressure. Accordingly, when the directional control valves 80*a*, 80*b* are operated at the same time, the hydraulic fluid delivered from the hydraulic pump 10 driven by the engine 1 is supplied, as with the first embodiment, to the actuators 4*a*, 4*b* at a distribution ratio depending on opening areas of the meter-in throttles of the directional control valves 20*a*, 20*b* regardless of the magnitudes of load pressures of the actuators 4*a*, 4*b* and even in the case of a saturation state where the delivery rate of the hydraulic pump 10 is insufficient for satisfying a demanded flow rate. As a result, the combined operation can be satisfactorily performed.

When the pilot lock switching valve 43 is shifted to the upper position B and the actuator lock switching valve 50A is shifted to the right-hand position F as viewed in the drawing, the delivery pressure of the hydraulic pump 10 is introduced to the pressure receiving sections 86*a*, 86*b* of the pressure compensating valves 81*a*, 81*b*.

Assuming here that, as with the above embodiments, the pressure downstream of the flow rate control section 82*a* of the directional control valve 80*a* acting upon the pressure receiving section 85*a* of the pressure compensating valve 81*a* is Pl, the output pressure of the actuator lock switching valve 50A acting upon the pressure receiving section 86*a* thereof is Pr, and the delivery pressure of the hydraulic pump 10 is Pp, Pr=Pp is held and Pl<Pp is resulted due to a pressure loss caused by the flow rate control section 82*a* of the directional control valve 80*a*, whereby the pressure compensating valve 81*a* is fully closed. Therefore, the hydraulic fluid no longer flows into the actuator 4*a* and hence the actuator 4*a* will not be driven even with the directional control valve 80*a* operated. In other words, the actuator 4*a* can be held locked by locking the pressure compensating valve 81*a*.

The above-described pressure relationship is similarly applied to the side of the pressure compensating valve 81*b*.

Accordingly, this embodiment can also provide similar advantages to those in the second embodiment by employing the pressure compensating valves 81*a*, 81*b* of the after orifice type.

Figure 4:
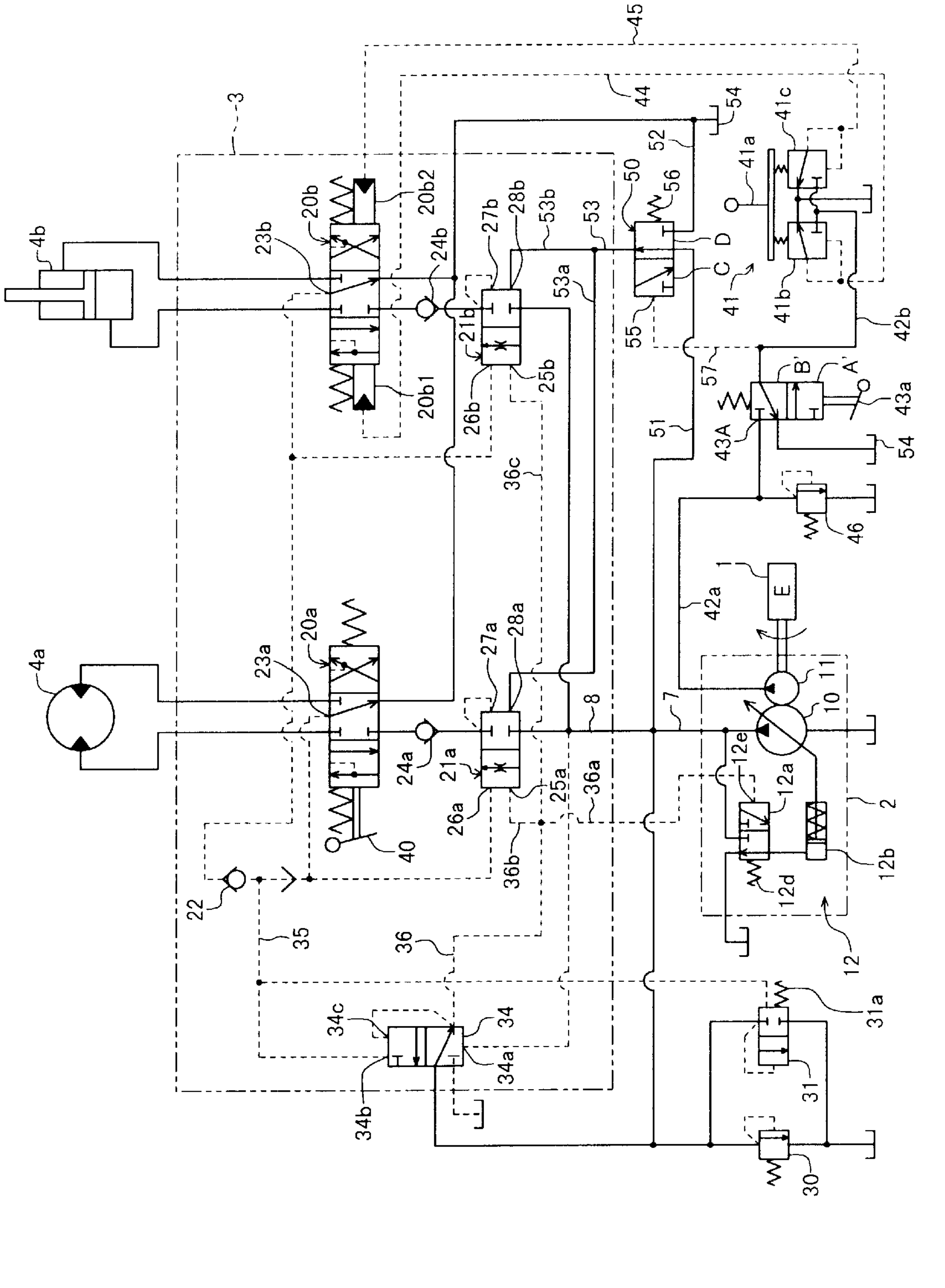
FIG. 4 is a diagram showing a hydraulic drive system according to a fourth embodiment of the present invention.
Figure 5:
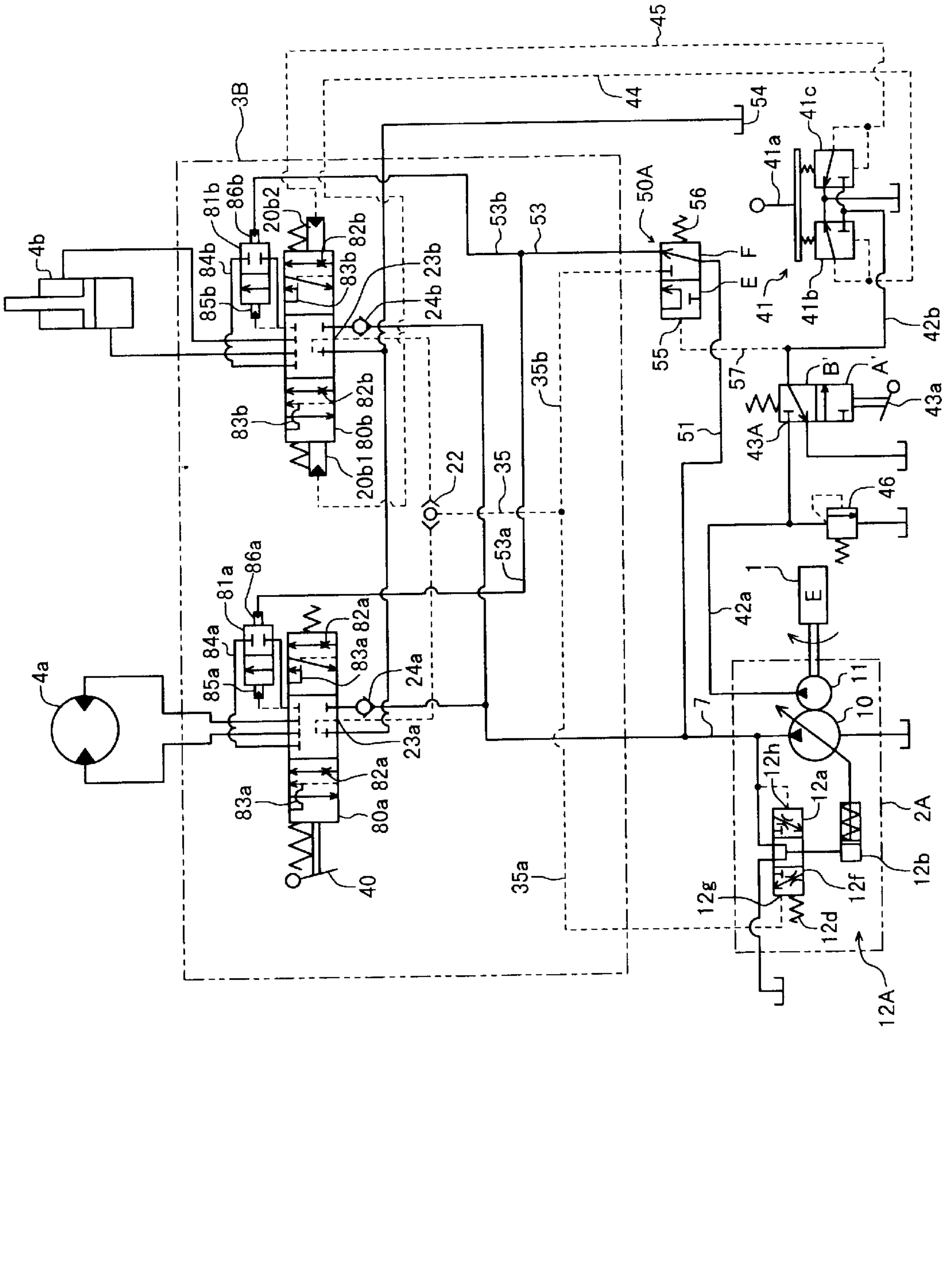
FIG. 5 is a diagram showing a hydraulic drive system according to a modification of the fourth embodiment of the present invention.

A fourth embodiment of the present invention will be described with reference to FIGS. 4 and 5. In FIGS. 4 and 5, identical components to those shown in FIGS. 1 to 3 are denoted by the same reference numerals. While the pilot lock switching valve 43 is a two-way valve in the above embodiments, it is constituted as a three-way valve in this embodiment.

In FIG. 4, numeral 43A denotes a pilot lock switching valve used in this embodiment. The pilot lock switching valve 43A is a three-way valve having two shift positions A', B'. When the pilot lock switching valve 43A is in th position A' on the lower side as viewed in the drawing, the pilot lines 42*a*, 42*b* are communicated with each other. When the pilot lock switching valve 43A is shifted to the position B' on the upper side as viewed in the drawing, the communication between the pilot lines 42*a*, 42*b* is cut off and the pilot line 42*b* is communicated with the reservoir 54. The remaining construction is the same as that in the first embodiment shown in FIG. 1.

In this embodiment thus constructed, when the pilot lock switching valve 43A is shifted to the upper position B' as viewed in the drawing, the supply of the hydraulic fluid from the pilot pump 11 to the pilot line 42*b* is cut off and the pilot line 42*b* is communicated with the reservoir 54. Accordingly, the actuator lock switching valve 50 is quickly shifted to the right-hand position D as viewed in the drawing, whereupon the delivery pressure of the hydraulic pump 10 is supplied to the pressure receiving sections 28*a*, 28*b* of the pressure compensating valves 21*a*, 21*b*. With this embodiment, therefore, the actuator can be locked with a better response in the embodiment shown in FIG. 1.

FIG. 5 shows a modification in which the pilot lock switching valve in the embodiment of FIG. 3 is constituted as the three-way valve 43A similarly to the fourth embodiment of FIG. 4. This modified embodiment can also lock the actuator with a better response.

As a matter of course, though not shown, the pilot lock switching valve in the embodiment of FIG. 2 may be constituted as the three-way valve 43A similarly to the fourth embodiment of FIG. 4.

Figure 6:
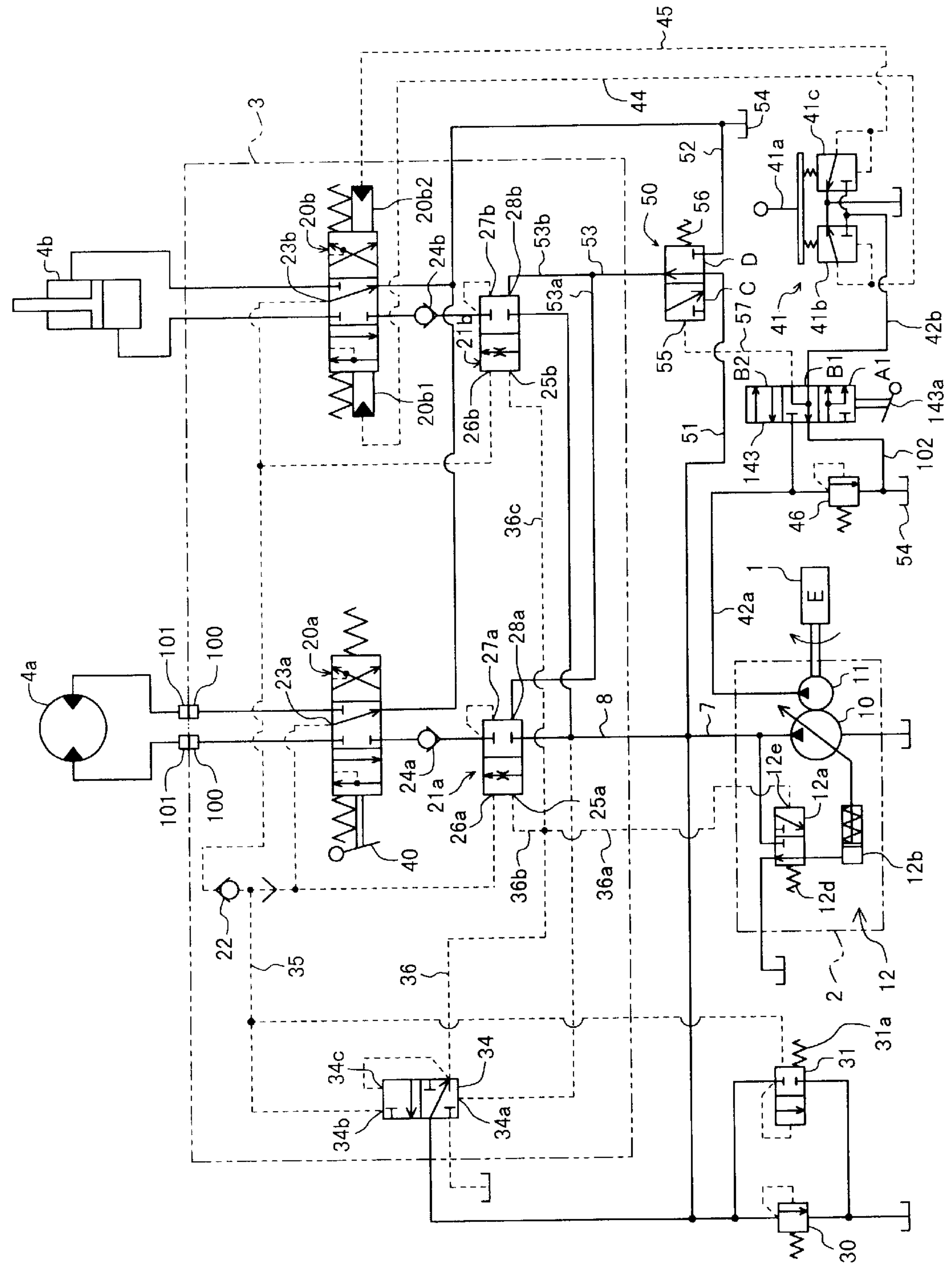
FIG. 6 is a diagram showing a hydraulic drive system according to a fifth embodiment of the present invention.

A fifth embodiment of the present invention will be described with reference to FIG. 6. In FIG. 6, identical components to those shown in FIG. 1 are denoted by the same reference numerals.

According to the embodiments described above, in a hydraulic drive system including pressure compensating valves controlled by an LS system, all actuators can be locked with a simple construction regardless of the shifting types of directional control valves, and can be prevented from malfunctioning in an inoperative condition while an engine is being driven. While such an arrangement capable of locking all the actuators is desirous from the viewpoint of safety, that arrangement has a disadvantage that, when a particular actuator is to be unlocked for performing work, it is impossible to unlock only the particular actuator.

In a small-sized hydraulic excavator, for example, reserve actuator ports are provided in a valve unit. Usually, when a bucket attached to the fore end of an operating machine is replaced by another front attachment such as a crusher, the reserve actuator ports are used for driving an actuator for the replaced front attachment.

As another usage form of the reserve actuator ports, in some cases, hydraulic supply lines for an external operating machine (such as a hand breaker and a hand cutter) are connected to the reserve actuator ports, and the hydraulic drive system is utilized as a hydraulic source. In such a case, the operator usually steps down from the cab and then performs work. With the construction of the preceding embodiments, however, it is impossible to unlock only the particular actuator. Hence, when the operator performs work while using the reserve actuator ports in that form, all the actuators must be unlocked and malfunctions of the other actuators cannot be prevented. Particularly, if all the actuators are unlocked in a condition where the operator is not boarded on the cab, a resulting influence would be increased in the event of a malfunction.

Further, it is general that a lock switching valve is interlocked with a gate lock lever provided at a doorway of the cab in such a manner as to be able to open and close. When stepping down from the cab, the operator raises the gate lock lever, whereby the lock switching valve is automatically shifted to a lock position. Accordingly, in order to unlock the actuator in the condition where the operator is not boarded on the cab, the operator must lower the gate lock lever from the outside of the cab. This entails a difficulty in manipulating a control lever for a manually shifted directional control valve associated with a reserve actuator from the outside of the cab, thus resulting in reduced operability. Furthermore, in the event of a malfunction, the operator cannot quickly access the control lever, and therefore safety is deteriorated.

This embodiment is intended, in a hydraulic drive system including pressure compensating valves controlled by an LS system, to make it possible to lock all actuators with a simple construction regardless of the shifting types of directional control valves, prevent all the actuators from malfunctioning in an inoperative condition while an engine is being driven, as well as to selectively unlock only a particular actuator as an occasion requires.

Referring to FIG. 6, the actuator 4*a* is a one employed when the bucket is replaced by another ordinary front attachment (e.g., a crusher).

The valve unit 3 includes reserve actuator ports 100 for replacement of the front attachment, the reserve actuator ports 100 being connected within the valve unit 3 to the actuator ports of the directional control valve 20*a*. Also, the reserve actuator ports 100 are connected to connection plugs 101 attached to the fore ends of hydraulic lines for the actuator 4*a*, whereby the directional control valve 20*a* is hydraulically connected to the actuator 4*a*.

The directional control valve 20*a* is a mechanically shifted valve. The actuator 4*b* is, e.g., an arm cylinder of a hydraulic excavator and the directional control valve 20*b* is a pilot-operated valve driven by a pilot control pressure supplied from the control lever device 41. Those points are the same as those in the first embodiment.

Numeral 143 is a pilot lock switching valve used in this embodiment. The pilot lock switching valve 143 is a 4-port, 3-position valve disposed between the pilot line 42*a* and a reservoir line 102 on one side and the pilot lines 42*b*, 57 on the other side. The pilot lock switching valve 143 can be switched over among three positions, i.e., a position A1 (unlock position) on the lower side, a position B1 (total lock position) at the center, and a position B2 (partial lock position) on the upper side as viewed in the drawing. When the pilot lock switching valve 143 is in the position A1, the communication between the pilot lines 42*b*, 57 and the reservoir line 102 is cut off and the pilot line 42*a* is communicated with the pilot lines 42*b*, 57. When the pilot lock switching valve 143 is in the position B1, the communication between the pilot line 42*a* and the pilot lines 42*b*, 57 is cut off and the pilot lines 42*b*, 57 are communicated with the reservoir line 102. When the pilot lock switching valve 143 is in the position B2, the pilot line 42*a* is communicated with the pilot line 57 and the pilot line 42*b* is communicated with the reservoir line 102. Unlike the first embodiment, the pilot line 57 is not connected to the pilot line 42*b*, but directly connected to the pilot lock switching valve 143. The reservoir line 102 is connected to the reservoir 54.

As with the pilot lock switching valve 43 of the first embodiment, the pilot lock switching valve 143 is of the mechanically shifted type having a spool directly driven by a control lever 143*a*. By holding the control lever 143*a* on a latch mechanism (not shown), the pilot lock switching valve 143 is usually held in the lower position A1 (unlock position) as viewed in the drawing. Thereby, as mentioned above, the control lever device 41 can produce the pilot control pressure upon manipulation of the control lever 41*a* and can drive the directional control valve 20*b*.

A control lever 143*a* is, for example, a gate lock lever provided at a doorway of a hydraulic excavator's cab in such a manner as to be able to open and close. The position A1 (unlock position) corresponds to a state where the gate lock lever is descended (state where the doorway is blocked off), and the position B1 (total lock position) and the position B2 (partial lock position) correspond to a state where the gate lock lever is ascended (state where the doorway is opened). Further, the position BI (total lock position) and the position B2 (partial lock position) are selectively maintained by raising the control lever 143*a* at different lever angles.

The operation of the thus-constructed hydraulic drive system of this embodiment will be described below.

In the case of the pilot lock switching valve 143 being in the position A1 (unlock position) and in the case of the pilot lock switching valve 143 being shifted to the position B1 (total lock position), the hydraulic drive system operates in the same manner as when the pilot lock switching valve 43 is shifted to the open position A and the closed position B in the first embodiment, respectively.

More specifically, when the pilot lock switching valve 143 is in the position A1 (unlock position), the delivery pressure of the pilot pump 11 is supplied to the pilot lines 42*b*, 57, the control lever device 41 is in a state capable of outputting the pilot control pressure, and the actuator lock switching valve 50 is in the position C (unlock position). Therefore, when the control lever 41*a* is manipulated, the directional control valve 20*b* is shifted depending on the direction and the input amount in and by which the control lever 41*a* is manipulated, thus enabling the actuator 4*b* to be driven. Also, when the directional control valves 20*a*, 20*b* are operated at the same time, the hydraulic fluid delivered from the hydraulic pump 10 is supplied to the actuators 4*a*, 4*b* at a distribution ratio depending on opening areas of the meter-in throttles of the directional control valves 20*a*, 20*b* even in the case of a saturation state. As a result, the combined operation can be satisfactorily performed.

When the pilot lock switching valve 143 is shifted to the position B1 (total lock position), the supply of the hydraulic fluid from the pilot pump 11 to the pilot lines 42*b*, 57 is cut off, and the pilot lines 42*b*, 57 are communicated with the reservoir line 102 so that the pilot lines 42*b*, 57 are held at the reservoir pressure. Therefore, the control lever device 41 can no longer output the operation pilot pressure even with the control lever 41*a* manipulated. Further, the actuator lock switching valve 50 is shifted to the position D (lock position), and the delivery pressure of the hydraulic pump 10 is supplied as a closed-valve lock pressure to the pressure receiving sections 28*a*, 28*b* of the pressure compensating valves 21*a*, 21*b*.

Accordingly, as described above in connection with the first embodiment, the pressure compensating valve 21*a* is fully closed and locked in the valve closed position, whereby the hydraulic fluid no longer flows into the actuator 4*a* and hence the actuator 4*a* will not be driven even with the directional control valve 20*a* operated. In other words, the actuator 4*a* can be held locked by locking the pressure compensating valve 21*a* in the valve closed position. On the side of the actuator 4*b*, the actuator 4*b* can be held locked by dual lock functions of locking both the directional control valve 20*b* and the pressure compensating valve 21*b*.

On the other hand, in the case of removing lines for the actuator 4*a* from the reserve actuator ports 100, connecting hydraulic supply lines for an external operating machine (such as a hand breaker and a hand cutter) instead to the reserve actuator ports 100, and utilizing the hydraulic drive system as a hydraulic source, the pilot lock switching valve 143 is shifted to the position B2 (partial lock position). In such a case, the pilot lines 42*a*, 57 are communicated with each other, allowing the delivery pressure of the pilot pump 11 to be supplied to the pilot line 57, and the pilot line 42*b* is communicated with the reservoir line 102 so that the pilot line 42*b* is held at the reservoir pressure.

Therefore, the actuator lock switching valve 50 is shifted to the position C (unlock position), and the closed-valve lock pressure (delivery pressure of the hydraulic pump 10) is not supplied to the pressure receiving sections 28*a*, 28*b* of the pressure compensating valves 21*a*, 21*b*, whereby the pressure receiving sections 28*a*, 28*b* are held at the reservoir pressure. As a result, on the side of the actuator for the external operating machine (the actuator 4*a* side in the illustrated embodiment), when the control lever 40 is manipulated to shift the directional control valve 20*a* from the neutral position, the pressure compensating valve 21*a* is opened as usual and the hydraulic fluid is supplied to the actuator for the external operating machine at a flow rate depending on the opening area of the meter-in throttle of the directional control valve 20*a*. Hence, the actuator for the external operating machine can be driven with the manipulation of the control lever 40, and the external operating machine can be operated.

On the side of the actuator 4*b*, since the pilot line 42*b* is held at the reservoir pressure as described above, the control lever device 41 can no longer output the pilot control pressure even with the control lever 41*a* manipulated. As a result, the directional control valve 20*b* is incapable of being shifted and the actuator 4*b* can be locked.

As described above, with this embodiment, similar advantages to those in the first embodiment can be obtained. For example, in spite of the directional control valve 20*a* for the actuator 4*a* being a mechanically shifted valve, all the actuators 4*a*, 4*b*, including the actuator 4*a*, can be locked.

Further, when the pilot lock switching valve 143 is shifted to the position B2 (partial lock position), the actuator 4*b* is locked, while only the actuator on the side of the directional control valve 20*a* can be selectively unlocked. Accordingly, in the case of performing work by removing lines for the actuator 4*a* from the reserve actuator ports 100, connecting hydraulic supply lines for an external operating machine (such as a hand breaker and a hand cutter) instead to the reserve actuator ports 100, and utilizing the hydraulic drive system as a hydraulic source, the work can be performed without a malfunction of the actuator 4*b* by shifting the pilot lock switching valve 143 to the upper position B2 as viewed in the drawing. Hence, the operator can perform the work with safety in a condition of being not boarded on the cab.

Figure 7:
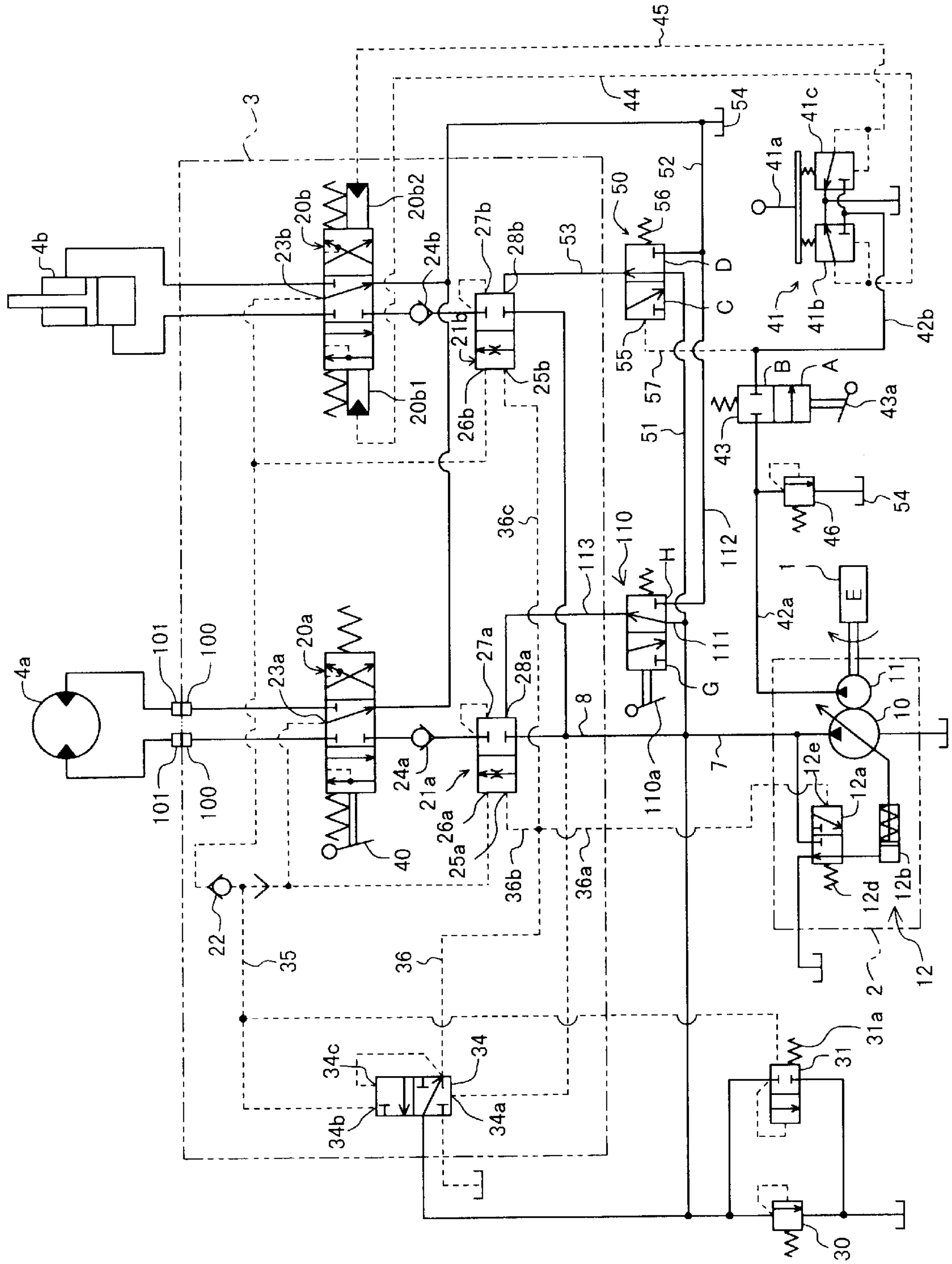
FIG. 7 is a diagram showing a hydraulic drive system according to a sixth embodiment of the present invention.

A sixth embodiment of the present invention will be described with reference to FIG. 7. In FIG. 7, identical components to those shown in FIGS. 1 to 6 are denoted by the same reference numerals. In this embodiment, another lock switching valve is provided separately from the pilot lock switching valve so that the actuator on the side of the mechanically shifted directional control valve can be separately locked.

In FIG. 7, a hydraulic drive system of this embodiment includes two switching valves, i.e., a pilot lock switching valve 43 and an actuator lock switching valve 110, instead of the pilot lock switching valve 43 in the embodiment shown in FIG. 1. Also, the pilot line 53 on the output side of the actuator lock switching valve 50 is connected to only the pressure receiving section 28*b* of the pressure compensating valve 21*b* at the end on the side acting in the closing direction. A pilot line 113 is connected to the pressure receiving section 28*a* of the pressure compensating valve 21*a* at the end on the side acting in the closing direction, and is also connected to the output side of the actuator lock switching valve 110.

The pilot lock switching valve 43 is the same as that in the first embodiment shown in FIG. 1, and the pilot line 57 leading to the pressure receiving section 55*c* of the actuator lock switching valve 50 is connected to the pilot line 42*b*.

The actuator lock switching valve 110 is disposed between a pilot line 111 branched from the pilot line 51 and a drain line 112 branched from the drain line 52 on one side and a pilot line 113 on the other side. The actuator lock switching valve 110 is a 3-port, 2-position switching valve similar to the actuator lock switching valve 50, which can be switched over between a left-hand position G (unlock position) and a right-hand position H (lock position) as viewed in the drawing. When the actuator lock switching valve 110 is in the position G, the communication between the pilot lines 111, 113 is cut off and the pilot line 113 is communicated with the drain line 112. When the actuator lock switching valve 110 is shifted to the position H, the pilot lines 111, 113 are communicated with each other and the communication between the pilot line 113 and the drain line 112 is cut off.

The actuator lock switching valve 110 is of the mechanically shifted type having a spool directly driven by a control lever 110*a*. By holding the control lever 110*a* on a latch mechanism (not shown), the actuator lock switching valve 110 is usually held in the position G (unlock position). Thereby, the pressure receiving section 28*a* of the pressure compensating valve 21*a* is held at the reservoir pressure, and the pressure compensating valve 21*a* can be operated without being locked in the valve closed position.

The control lever 110*a* may be independent of the control lever (gate lock lever) 43*a* of the pilot lock switching valve 43, but it is preferably interlocked with the control lever 43*a*. In the latter case, both levers are interlocked, by way of example, as follows. When the control lever (gate lock lever) 43*a* is lowered to shift the pilot lock switching valve 43 to the position A (unlock position), the actuator lock switching valve 110 takes the position G (unlock position). When the control lever (gate lock lever) 43*a* is raised to shift the pilot lock switching valve 43 to the position B (lock position), the actuator lock switching valve 110 is also shifted to the position H (lock position). When the control lever (gate lock lever) 43*a* is further raised, the actuator lock switching valve 110 is shifted to the position G (unlock position) while the pilot lock switching valve 43 remains held in the position B (lock position).

In this embodiment thus constructed, when the pilot lock switching valve 43 and the actuator lock switching valve 110 are respectively in the positions A and G (unlock positions), the control lever device 41 is in a state capable of outputting the pilot control pressure and the pressure compensating valves 21*a*, 21*b* are not locked in the valve closed positions, as described above. Therefore, the actuators 4*a*, 4*b* can be driven depending on the directions and the input amounts in and by which the control levers 40, 41*a* are manipulated.

When the pilot lock switching valve 43 and the actuator lock switching valve 110 are shifted respectively to the positions B and H (lock positions), the control lever device 41 can no longer produce the pilot control pressure, and the directional control valve 20*b* is incapable of being shifted. In addition, the delivery pressure of the hydraulic pump 10 is supplied as a closed-valve lock pressure to the pressure receiving sections 28*a*, 28*b* of the pressure compensating valves 21*a*, 21*b*, whereby the pressure compensating valves 21*a*, 21*b* are locked in the valve closed position. Accordingly, on the side of the actuator 4*a*, the pressure compensating valve 21*a* can be locked in the valve closed position. On the side of the actuator 4*b*, the actuator 4*b* can be held locked by dual lock functions of making the directional control valve 20*b* disable to operate and locking the pressure compensating valve 21*b* in the valve closed position.

When the pilot lock switching valve 43 is shifted to the position B (lock position) and the actuator lock switching valve 110 remains held in the position G (unlock position), the pressure compensating valve 21*a* is not locked in the valve closed position on the side of the actuator 4*a*. Therefore, the actuator 4*a* can be driven by manipulating the control lever 40 of the mechanically shifted directional control valve 20*a* to operate it. On the side of the actuator 4*b*, however, the actuator 4*b* can be held locked by dual lock functions of making the directional control valve 20*b* disable to operate and locking the pressure compensating valve 21*b* in the valve closed position.

Accordingly, as with the first embodiment, this embodiment can also provide similar advantages that, in the hydraulic drive system including the pressure compensating valves 21*a*, 21*b* controlled by the LS system, all the actuators 4*a*, 4*b* can be locked with a simple construction even in the case of including the mechanically shifted directional control valve 20*a*, and can be prevented from malfunctioning in an inoperative condition while the engine is being driven. In addition, only the particular actuator 4*a* can be selectively unlocked as an occasion requires.

In the sixth embodiment shown in FIG. 7, the pilot lock switching valve 43 is a 2-port, 2-position valve. As a matter of course, however, the pilot lock switching valve may be constituted as the 3-port, 2-position valve 43A similarly to the fourth embodiment shown in FIGS. 4 and 5. In such a case, as described above, the actuator can be locked with a better response.

Figure 8:
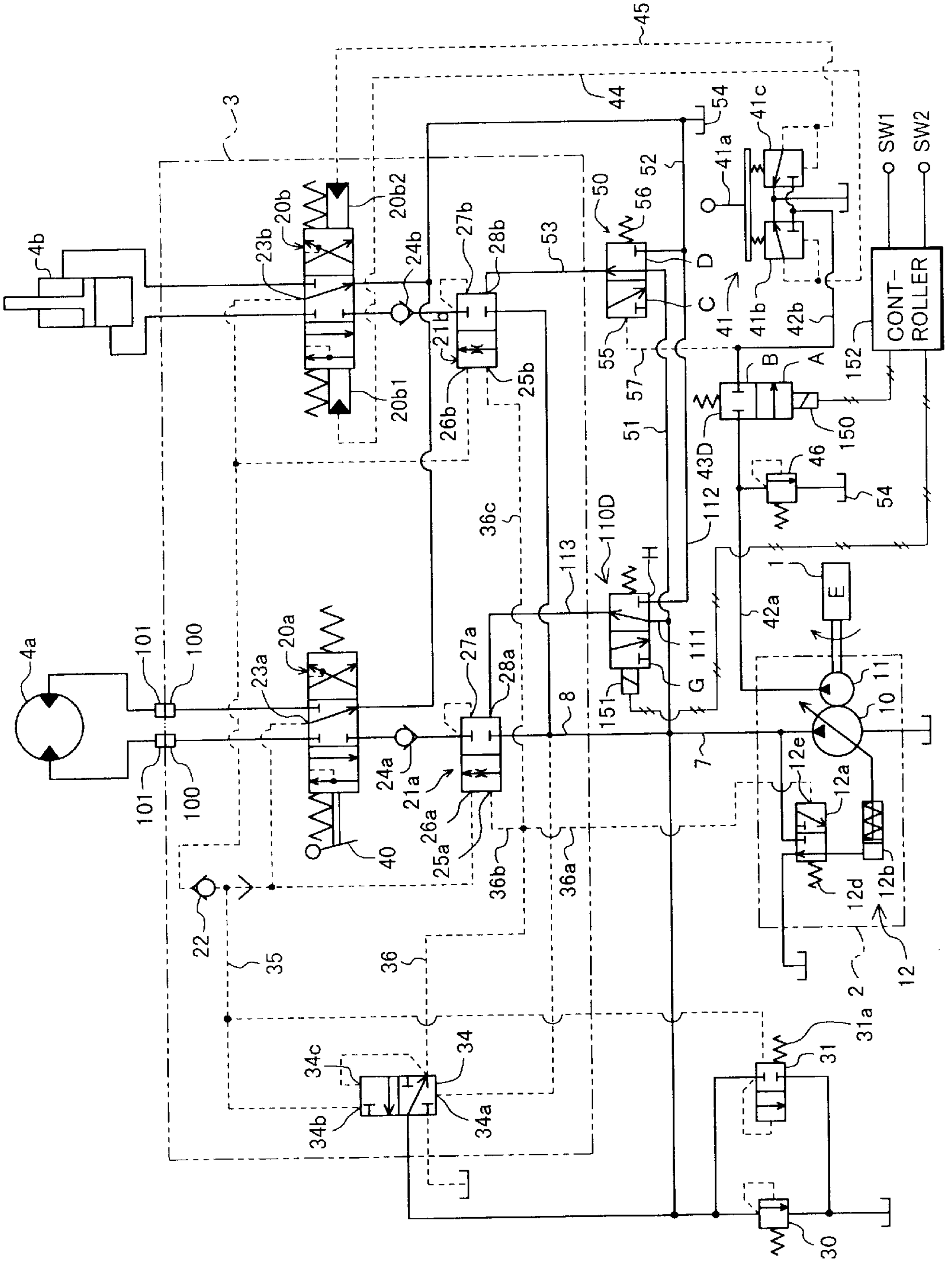
FIG. 8 is a diagram showing a hydraulic drive system according to a seventh embodiment of the present invention.

A seventh embodiment of the present invention will be described with reference to FIGS. 8 and 9. In FIGS. 8 and 9, identical components to those shown in FIGS. 1, 6 and 7 are denoted by the same reference numerals. In this embodiment, the pilot lock switching valve and the actuator lock switching valve in the sixth embodiment are each constituted as a solenoid-shifted valve.

In FIG. 8, as with the embodiment shown in FIG. 7, a hydraulic drive system of this embodiment includes two switching valves, i.e., a pilot lock switching valve 43D and an actuator lock switching valve 110D, instead of the pilot lock switching valve 143 in the embodiment shown in FIG. 6.

The pilot lock switching valve 43D and the actuator lock switching valve 110D are both solenoid-shifted valves having solenoid shifting sectors 150, 151, respectively. Electrical signals are applied to the solenoid shifting sectors 150, 151 from a controller 152. Further, switches SW1, SW2 are provided which are manipulated by the operator for shifting the pilot lock switching valve 43D and the actuator lock switching valve 110D. Signals from the switches SW1, SW2 are inputted to the controller 152. The switch SW1 is a total unlock switch for switching over all of the actuators 4*a*, 4*b* between the locked and unlocked states. The switch SW2 is a partial unlock switch for switching over one particular actuator, i.e., the actuator 4*a*, between the locked and unlocked states.

The controller 152 executes predetermined procedures of processing in accordance with the signals from the switches SW1, SW2 and then outputs electrical signals to the solenoid shifting sectors 150, 151 based on the processing result.

FIG. 9 shows processing details executed by the controller 152. The pilot lock switching valve 43D and the actuator lock switching valve 110D have the same shift positions as those of the pilot lock switching valve 43 and the actuator lock switching valve 110 in the sixth embodiment. Thus, the pilot lock switching valve 43D and the actuator lock switching valve 110D have respectively the positions A and G as unlock positions and the positions B and H as lock positions.

When the total unlock switch SW1 is turned on, the pilot lock switching valve 43D and the actuator lock switching valve 110D are shifted to the positions A and G (unlock positions) regardless of the state of the partial unlock switch SW2, whereby all the actuators are unlocked. When the total unlock switch SW1 is turned off, the pilot lock switching valve 43D is shifted to the position B, i.e., the lock position, and the actuator lock switching valve 100D is shifted depending on the position of the partial unlock switch SW2 as follows:

when the partial unlock switch SW2 is also turned off the actuator lock switching valve 110D is in the position H (lock position)

when the partial unlock switch SW2 is also turned on the actuator lock switching valve 110D is in the position G (unlock position)

In this embodiment, as described above, by turning on the total unlock switch SW1, all the actuators are unlocked, and therefore the actuators 4*a*, 4*b* can be driven depending on the directions and the input amounts in and by which the control levers 40, 41*a* are manipulated.

When the total unlock switch SW1 is turned off and the partial unlock switch SW2 is also turned off, the pilot lock switching valve 43D and the actuator lock switching valve 110D are shifted to the positions B and H (lock positions). On the side of the actuator 4*a*, therefore, the actuator 4*a* can be held locked by locking the pressure compensating valve 21*a* in the valve closed position. On the side of the actuator 4*b*, the actuator 4*b* can be held locked by dual lock functions of making the directional control valve 20*b* disable to operate and locking the pressure compensating valve 21*b* in the valve closed position.

When the total unlock switch SW1 is turned off and the partial unlock switch SW2 is turned on, the pilot lock switching valve 43D is shifted to the position B (lock position) and the actuator lock switching valve 110D is shifted to the position G (unlock positions). On the side of the actuator 4*a*, therefore, the pressure compensating valve 21*a* is not locked in the valve closed position, and the actuator 4*a* can be driven by manipulating the control lever 40 of the mechanically shifted directional control valve 20*a* so as to operate the directional control valve 20*a*. On the side of the actuator 4*b*, the actuator 4*b* can be held locked by dual lock functions as described above.

Accordingly, as with the first embodiment, this embodiment can also provide similar advantages that, in the hydraulic drive system including the pressure compensating valves 21*a*, 21*b* controlled by the LS system, all the actuators 4*a*, 4*b* can be locked with a simple construction even in the case of including the mechanically shifted directional control valve 20*a*, and can be prevented from malfunctioning in an inoperative condition while the engine is being driven. In addition, only the particular actuator 4*a* can be selectively unlocked as an occasion requires.

In this embodiment, the pilot lock switching valve 43D of the solenoid-shifted type is a 2-port, 2-position valve, but it may be, as a matter of course, constituted as the 3-port, 2-position valve 43A similarly to the fourth embodiment shown in FIGS. 4 and 5.

Figure 10:
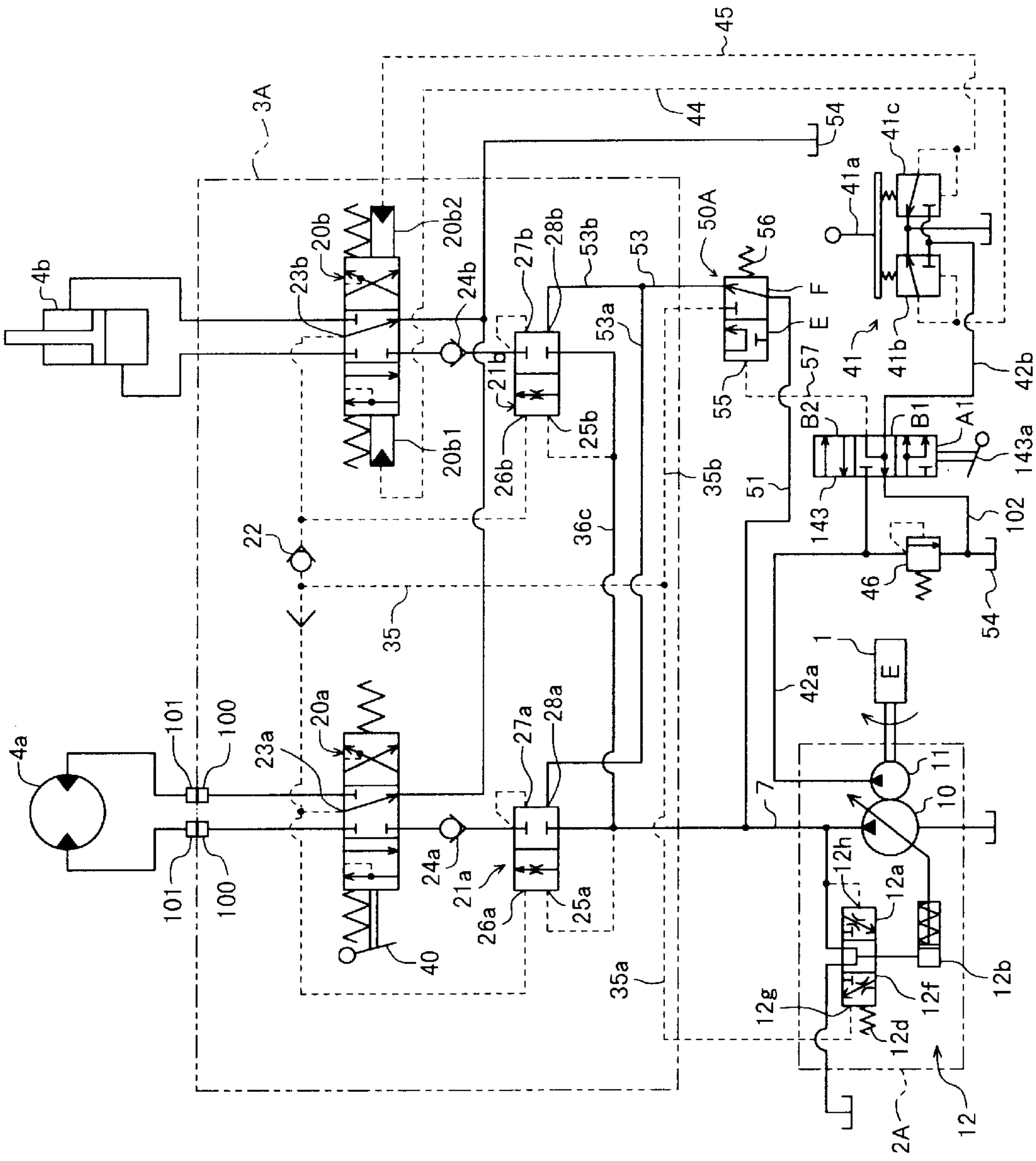
FIG. 10 is a diagram showing a hydraulic drive system according to an eighth embodiment of the present invention.

An eighth embodiment of the present invention will be described with reference to FIG. 10. In FIG. 10, identical components to those shown in FIGS. 1, 2 and 6 are denoted by the same reference numerals. In this embodiment, the fifth embodiment shown in FIG. 6 is modified in the same manner as modifying the first embodiment shown in FIG. 1 to obtain the second embodiment shown in FIG. 2.

More specifically, in FIG. 10, a hydraulic drive system of this embodiment comprises a hydraulic source 2A, a valve unit 3A, and an actuator lock switching valve 50A. These components have different constructions from those in the fifth embodiment shown in FIG. 6. The hydraulic source 2A, the valve unit 3A, and the actuator lock switching valve 50A are the same as those used in the second embodiment shown in FIG. 2.

This embodiment can also provide similar advantages to those in the fifth embodiment in the hydraulic drive system wherein the actuator 4*a* on the side of the mechanically shifted directional control valve 20*a* is a one, which does not raise a holding pressure when it is stopped and which maintains the relationship of $Pl<Pi$.

Figure 11:
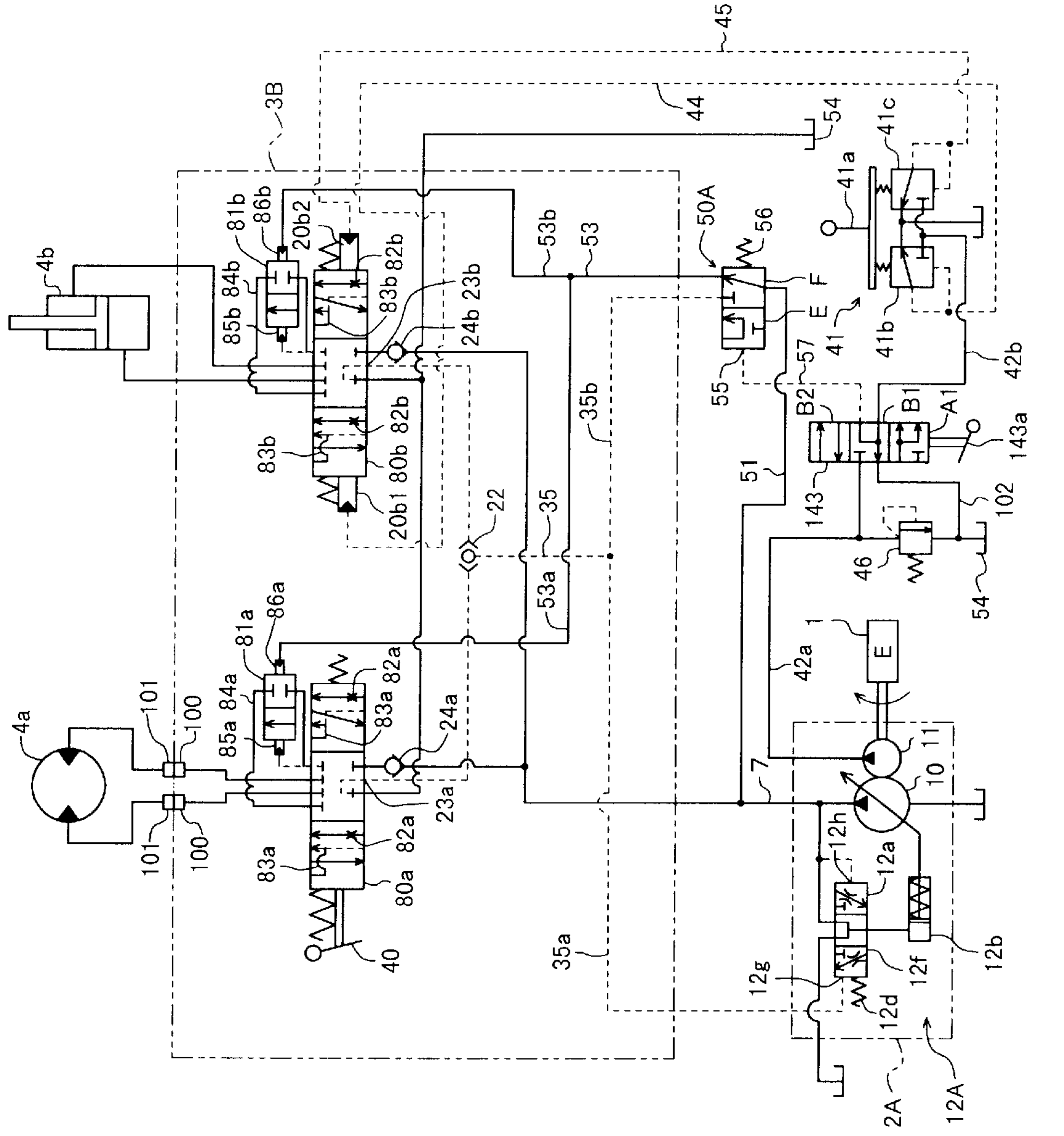
FIG. 11 is a diagram showing a hydraulic drive system according to a ninth embodiment of the present invention.

A ninth embodiment of the present invention will be described with reference to FIG. 11. In FIG. 11, identical components to those shown in FIGS. 1, 3 and 6 are denoted by the same reference numerals. While the fifth to eighth embodiments employ a pressure compensating valve of the before orifice type being disposed upstream of the meter-in throttle of the directional control valve, this embodiment employs a pressure compensating valve of the after orifice type being disposed downstream of the meter-in throttle of the directional control valve.

In FIG. 11, a hydraulic drive system of this embodiment includes a valve unit 3B, which has a different construction from that in the eighth embodiment shown in FIG. 10. The valve unit 3B is the same as that used in the third embodiment shown in FIG. 3, and comprises a plurality of closed center directional control valves 80*a*, 80*b*, a plurality of pressure compensating valves 81*a*, 81*b*, load check valves 24*a*, 24*b*, and a shuttle valve 22. The pressure compensating valves 81*a*, 81*b* are of the after orifice type being disposed downstream of meter-in throttles of the directional control valves 80*a*, 80*b*.

This embodiment can also provide similar advantages as those in the fifth and eighth embodiments in the case of employing the pressure compensating valves 81*a*, 81*b* of the after orifice type.

While the embodiment of FIG. 11 is obtained by employing the pressure compensating valves of the after orifice type instead of the pressure compensating valves of the before orifice type used in the embodiment of FIG. 10, the embodiments shown in FIGS. 6, 7 and 8 may also be modified so as to employ the pressure compensating valves of the after orifice type.

In any of the foregoing embodiments, the actuator 4*b* is held locked by dual lock mechanisms of locking the directional control valve 20*b* (pilot lock) and locking the pressure compensating valve 21*b*. However, the actuator 4*b* may be held locked by only one of the dual lock mechanisms.

Also, while the above description is made in connection with a system including a single unit of the actuator 4*a* associated with the mechanically shifted directional control valve 20*a* and a single unit of the other actuator 4*b*, these types of actuators may be of course disposed in plural number for each type. In such a case, the directional control valve and the pressure compensating valve are disposed are also disposed in plural number correspondingly. Then, a plurality of actuators on the actuator 4*a* side are held locked by locking the directional control valves, and a plurality of actuators on the actuator 4*b* side are held locked by locking the directional control valves (pilot pressures) and/or the pressure compensating valves.

Industrial Applicability

According to the present invention, even when a directional control valve for an actuator is a mechanically shifted valve, the actuator can be locked and can be prevented from malfunctioning in an inoperative condition while an engine is being driven. Also, since the system of the present invention can utilize a pressure receiving section that is originally provided in a pressure compensating valve for a drain passage, the actuator can be locked with a simple construction. Moreover, since a main passage for supplying a hydraulic fluid to the actuator therethrough is cut off, the actuator can be reliably locked.

Further, even when a mechanically shifted directional control valve for a front attachment is added to employ an additional attachment such as a crusher, an actuator for the attachment can be locked with a simple construction by introducing an output pressure of a first lock switching valve to an associated pressure compensating valve.

Still further, according to the present invention, dual lock functions of locking the directional control valve and the pressure compensating valve are provided for an actuator associated with a pilot-operated directional control valve. Therefore, the actuator can be more reliably locked.

In addition, according to the present invention, only a particular actuator can be selectively unlocked as an occasion requires.

What is claimed is:

1. A hydraulic drive system comprising a variable displacement hydraulic pump (10), a plurality of actuators (4*a*,4*b*) driven by a hydraulic fluid delivered from said hydraulic pump, a plurality of directional control valves (20*a*,20*b*) for controlling respective flow rates of the hydraulic fluid supplied from said hydraulic pump to said plurality of actuators, a plurality of pressure compensating valves (21*a*,21*b*) for controlling respective differential pressures across said plurality of directional control valves, and pump control means (12) for performing load sensing control to hold a delivery pressure of said hydraulic pump higher than a maximum load pressure of said plurality of actuators by a target differential pressure, said plurality of pressure compensating valves including a first pressure compensating valve (21*a*) provided in association with a particular one (20*a*) of said plurality of directional control valves and a second pressure compensating valve (21*b*) provided in association with the other directional control valve (20*b*) than said particular one, wherein said hydraulic drive system further comprises:

a first lock switching valve (50; 50A; 110; 110D) having first and second shift positions (C,D; E,F; G,H) and outputting a pressure of a hydraulic supply source when said first lock switching valve is shifted from the first position to the second position; and a first pressure receiving section (28*a*) provided at an end of said first pressure compensating valve (21*a*) on the side acting in the closing direction, and connected to the output side of said first lock switching valve, said first pressure compensating valve being fully closed when said first lock switching valve is shifted to the second position and the pressure of said hydraulic supply source is introduced to said first pressure receiving section.

2. A hydraulic drive system according to claim 1, wherein said particular directional control valve (20*a*) is a mechanically shifted valve, and said other directional control valve (20*b*) than said particular one is a pilot-shifted valve driven by a pilot control pressure.

3. A hydraulic drive system according to claim 1, further comprising:

a pilot hydraulic source (11);

operating means (41) connected to said pilot hydraulic source via a pilot line (42*a*,42*b*), generating the pilot control pressure based on a hydraulic pressure of said pilot hydraulic source, and including pilot valves (41*b*, 41*c*) for driving said other directional control valve (20*b*) than said particular one;

a second lock switching valve (43; 43A; 143) disposed in said pilot line, having third and fourth shift positions (A,B; A',B'; A1,B1), and cutting off said pilot line when said second lock switching valve is shifted from the third position to the fourth position, said second lock switching valve being operated by an operator; and interlock switching means (55,57) for shifting said first lock switching valve (50; 50A) from the first position to the second position in interlock with shifting of said second lock switching valve from the third position to the fourth position.

4. A hydraulic drive system according to claim 3, further comprising a second pressure receiving section (28*b*) provided at an end of said second pressure compensating valve (21*b*) on the side acting in the closing direction, and connected to the output side of said first lock switching valve (50,50A).

5. A hydraulic drive system according to claim 3, wherein said interlock switching means includes a third pressure receiving section (55) which is provided at an end of said first lock switching valve (50; 50A) on the side acting to shift said first lock switching valve to the first position, and which is connected to said pilot line (42*b*) on the output side of said second lock switching valve (43; 43A).

6. A hydraulic drive system according to claim 1, further comprising:

a pilot hydraulic source (11);

operating means (41) connected to said pilot hydraulic source via a pilot line (42*a*,42*b*), generating the pilot control pressure based on a hydraulic pressure of said pilot hydraulic source, and including pilot valves (41*b*, 41*c*) for driving said other directional control valve (20*b*) than said particular one;

a second lock switching valve (143) disposed in said pilot line and having third, fourth and fifth shift positions (A1,B1,B2), said second lock switching valve being operated by an operator; and a third pressure receiving section (55) provided in said first lock switching valve and shifting said first lock switching valve from the second position to the first position when the pressure of said pilot hydraulic source is introduced to said third pressure receiving section, said second lock switching valve connecting said pilot line to both said pilot valves and said third pressure receiving section when said second lock switching valve is in the third position, cutting off the connection between said pilot line and both said pilot valves and said third pressure receiving section when said second lock switching valve is in the fourth position, and cutting of the connection between said pilot line and said pilot valves and connecting said pilot line to said third pressure receiving section when said second lock switching valve is in the fifth position.

7. A hydraulic drive system according to claim 6, further comprising a second pressure receiving section (28*b*) provided at an end of said second pressure compensating valve (21*b*) on the side acting in the closing direction, and connected to the output side of said first lock switching valve (50,50A).

8. A hydraulic drive system according to claim 1, further comprising:

a pilot hydraulic source (11);

operating means (41) connected to said pilot hydraulic source via a pilot line (42*a*,42*b*), generating the pilot control pressure based on a hydraulic pressure of said pilot hydraulic source, and including pilot valves (41*b*, 41*c*) for driving said other directional control valve (20*b*) than said particular one;

a second lock switching valve (43; 43D) disposed in said pilot line, having third and fourth shift positions (A,B), and cutting off said pilot line when said second lock switching valve is shifted from the third position to the fourth position, said second lock switching valve being operated by an operator; and lock operating means (43*a*,110*a*; 150,151,152) enabling said first lock switching valve to be shifted between the first position and the second position when said second lock switching valve is in the fourth position.

9. A hydraulic drive system according to claim 8, further comprising:

a third lock switching valve (50) having sixth and seventh shift positions (C,D) and outputting the pressure of said hydraulic supply source when said third lock switching valve is shifted from the sixth position to the seventh position;

interlock switching means (55,57) for shifting said third lock switching valve from the sixth position to the seventh position in interlock with shifting of said second lock switching valve (43;43D) from the third position to the fourth position; and a second pressure receiving section (28*b*) provided at an end of said second pressure compensating valve (21*b*) on the side acting in the closing direction, and connected to the output side of said third lock switching valve.

10. A hydraulic drive system according to claim 8, wherein said first and second lock switching valves (110,43) are mechanically shifted valves directly shifted by control levers (110*a*,43*a*), and said lock operating means includes said control levers (110*a*,43*a*).

11. A hydraulic drive system according to claim 8, wherein said first and second lock switching valves (110D, 43D) are solenoid-shifted valves shifted by electrical signals, and said lock operating means includes a controller (152) for generating the electrical signals.

* * * * *

UNITED STATES PATENT AND TRADEMARK OFFICE

CERTIFICATE OF CORRECTION

PATENT NO. : 6,526,747 B2
DATED : March 4, 2003
INVENTOR(S) : K. Nakatani et al.

It is certified that error appears in the above-identified patent and that said Letters Patent is hereby corrected as shown below:

Title page,
Item [86], PCT No., please change to -- PCT/JP01/00429 --.

Signed and Sealed this

Twenty-second Day of July, 2003

JAMES E. ROGAN
*Director of the United States Patent and Trademark Office*